US008115767B2

(12) United States Patent
Stich

(10) Patent No.: US 8,115,767 B2
(45) Date of Patent: Feb. 14, 2012

(54) COMPUTER GRAPHICS SHADOW VOLUMES USING HIERARCHICAL OCCLUSION CULLING

(75) Inventor: Martin Stich, Berlin (DE)

(73) Assignee: Mental Images GmbH, Berlin (DE)

( * ) Notice: Subject to any disclaimer, the term of this patent is extended or adjusted under 35 U.S.C. 154(b) by 1103 days.

(21) Appl. No.: 11/951,666

(22) Filed: Dec. 6, 2007

(65) Prior Publication Data

US 2008/0180440 A1 Jul. 31, 2008

Related U.S. Application Data

(60) Provisional application No. 60/869,222, filed on Dec. 8, 2006.

(51) Int. Cl.
*G06T 15/50* (2011.01)
(52) U.S. Cl. ........ 345/426; 345/419; 345/420; 345/421; 345/423; 345/555; 345/582
(58) Field of Classification Search ................... 345/421, 345/422, 423, 424, 426, 419, 420, 582
See application file for complete search history.

(56) References Cited

U.S. PATENT DOCUMENTS

| | | | | |
|---|---|---|---|---|
| 5,867,166 | A | 2/1999 | Myhrvold | |
| 6,072,497 | A * | 6/2000 | Lichtenbelt et al. | 345/424 |
| 6,437,782 | B1 * | 8/2002 | Pieragostini et al. | 345/426 |
| 6,489,955 | B1 * | 12/2002 | Newhall, Jr. | 345/419 |
| 6,525,730 | B2 | 2/2003 | Tampieri | |
| 6,825,839 | B2 * | 11/2004 | Huang et al. | 345/423 |
| 6,876,362 | B1 * | 4/2005 | Newhall et al. | 345/426 |
| 6,967,662 | B2 * | 11/2005 | Fenney | 345/582 |
| 6,999,073 | B1 * | 2/2006 | Zwern et al. | 345/420 |
| 7,030,878 | B2 * | 4/2006 | Xu et al. | 345/422 |
| 7,145,565 | B2 * | 12/2006 | Everitt et al. | 345/426 |
| 7,248,261 | B1 * | 7/2007 | Hakura | 345/426 |
| 7,277,098 | B2 * | 10/2007 | Xu et al. | 345/555 |
| 7,782,318 | B2 * | 8/2010 | Shearer | 345/426 |
| 2002/0089501 | A1 | 7/2002 | Tampieri | |
| 2005/0134588 | A1 | 6/2005 | Aila | |
| 2005/0206647 | A1 | 9/2005 | Xu | |
| 2005/0225670 | A1 | 10/2005 | Wexler | |
| 2006/0038822 | A1 | 2/2006 | Xu | |
| 2006/0158450 | A1 | 7/2006 | Ferguson | |

FOREIGN PATENT DOCUMENTS

| | | |
|---|---|---|
| JP | 2002-074391 | 3/2002 |
| JP | 2004-028059 | 10/2004 |

OTHER PUBLICATIONS

Hornus, "ZP+: correct Z-pass Stencil Shadows", 2005 Symposium on Interactive 3D Graphics, pp. 195-202, Apr. 2005.
May 24, 2011 Notice of Reasons for Rejection in Japanese Patent Application No. 2009-540471 corresponding to PCT/US2007/086606.

* cited by examiner

*Primary Examiner* — Kimbinh T Nguyen
(74) *Attorney, Agent, or Firm* — Jacobs & Kim LLP; David Jacobs

(57) ABSTRACT

Techniques, systems, arrangements, and computer program products are operable in computer graphics systems to make shadow volumes more general with respect to the meshes that can serve as occluding geometry in such computer graphics systems, as well as for accelerating shadow volume techniques, particularly for large and complex input scenes.

9 Claims, 23 Drawing Sheets

30

SHADOW VOLUME CREATION MODULE, 10

----

BVH TRAVERSAL MODULE, 20

FIG. 1

```
                                                                    400a
extension GL_EXT_geometry_shader4: enable uniform vec4 l_pos;  // Light position (eye space)
uniform int robust;  // Robust generation needed?
uniform int zpass;   // Is it safe to do z-pass?

void main()

{
  vec3 ns[3];  // Normals
  vec3 d[3];   // Directions toward light
  vec4 v[4];   // Temporary vertices vec4 or_pos[3] = { // Triangle oriented toward light source gl_PositionIn[0],
    gl_PositionIn[2],
    gl_PositionIn[4]
};

// Compute normal at each vertex.

ns[0] = cross( gl_PositionIn[2].xyz - gl_PositionIn[0].xyz,
  gl_PositionIn[4].xyz - gl_PositionIn[0].xyz );

ns[1] = cross( gl_PositionIn[4].xyz - gl_PositionIn[2].xyz,
  gl_PositionIn[0].xyz - gl_PositionIn[2].xyz );

ns[2] = cross( gl_PositionIn[0].xyz - gl_PositionIn[4].xyz,
  gl_PositionIn[2].xyz - gl_PositionIn[4].xyz );

// Compute direction from vertices to light.

d[0] = l_pos.xyz-l_pos.w*gl_PositionIn[0].xyz;
d[1] = l_pos.xyz-l_pos.w*gl_PositionIn[2].xyz;
d[2] = l_pos.xyz-l_pos.w*gl_PositionIn[4].xyz;

// Check if the main triangle faces the light.

bool faces_light = true;
if ( !(dot(ns[0],d[0])>0 || dot(ns[1],d[1])>0 ||
       dot(ns[2],d[2])>0) ) {

// Not facing the light and not robust, ignore.

if ( robust == 0 ) return;
```

FIG. 8A

```
                                                                400b
    // Flip vertex winding order in or_pos.

or_pos[1] = gl_PositionIn[4];
    or_pos[2] = gl_PositionIn[2];
    faces_light = false;
}

// Render caps. This is only needed for z-fail.

if ( zpass == 0 ) {

// Near cap: simply render triangle.

gl_Position = gl_ProjectionMatrix*or_pos[0];
    EmitVertex();
    gl_Position = gl_ProjectionMatrix*or_pos[1];
    EmitVertex();
    gl_Position = gl_ProjectionMatrix*or_pos[2];
    EmitVertex(); EndPrimitive();

// Far cap: extrude positions to infinity.

v[0] =vec4(l_pos.w*or_pos[0].xyz-l_pos.xyz,0);
    v[1] =vec4(l_pos.w*or_pos[2].xyz-l_pos.xyz,0);
    v[2] =vec4(l_pos.w*or_pos[1].xyz-l_pos.xyz,0);
    gl_Position = gl_ProjectionMatrix*v[0];
    EmitVertex();
    gl_Position = gl_ProjectionMatrix*v[1];
    EmitVertex();
    gl_Position = gl_ProjectionMatrix*v[2];
    EmitVertex(); EndPrimitive();
}

// Loop over all edges and extrude if needed.

for ( int i=0; i<3; i++ ) {

// Compute indices of neighbor triangle.

int v0 = i*2;
    int nb = (i*2+1);
    int v1 = (i*2+2) % 6;

// Compute normals at vertices, the *exact*
    // same way as done above!

ns[0] = cross(
           gl_PositionIn[nb].xyz-gl_PositionIn[v0].xyz,
           gl_PositionIn[v1].xyz-gl_PositionIn[v0].xyz);

ns[1] = cross(
           gl_PositionIn[v1].xyz-gl_PositionIn[nb].xyz,
           gl_PositionIn[v0].xyz-gl_PositionIn[nb].xyz);
```

FIG. 8B

```
                                                                  400c
    ns[2] = cross(
      gl_PositionIn[v0].xyz-gl_PositionIn[v1].xyz,
      gl_PositionIn[nb].xyz-gl_PositionIn[v1].xyz);

// Compute direction to light, again as above.

d[0] =l_pos.xyz-l_pos.w*gl_PositionIn[v0].xyz;
    d[1] =l_pos.xyz-l_pos.w*gl_PositionIn[nb].xyz;
    d[2] =l_pos.xyz-l_pos.w*gl_PositionIn[v1].xyz;

// Extrude the edge if it does not have a
    // neighbor, or if it's a possible silhouette.

if ( gl_PositionIn[nb].w < 1e-3 ||
        ( faces_light != (dot(ns[0],d[0])>0 ||
                          dot(ns[1],d[1])>0 ||
                          dot(ns[2],d[2])>0) ))

{
      // Make sure sides are oriented correctly.

int i0 = faces_light ? v0 : v1;
      int i1 = faces_light ? v1 : v0;

v[0] = gl_PositionIn[i0];
      v[1] = vec4(l_pos.w*gl_PositionIn[i0].xyz - l_pos.xyz, 0);
      v[2] = gl_PositionIn[i1];
      v[3] = vec4(l_pos.w*gl_PositionIn[i1].xyz - l_pos.xyz, 0);

// Emit a quad as a triangle strip.

gl_Position = gl_ProjectionMatrix*v[0];
      EmitVertex();
      gl_Position = gl_ProjectionMatrix*v[1];
      EmitVertex();
      gl_Position = gl_ProjectionMatrix*v[2];
      EmitVertex();
      gl_Position = gl_ProjectionMatrix*v[3];
      EmitVertex(); EndPrimitive();
    }
  }
}
```

FIG. 8C

COMPUTER GRAPHICS SHADOW VOLUMES USING HIERARCHICAL OCCLUSION CULLING

CROSS-REFERENCE TO RELATED APPLICATIONS

This application for patent claims the priority benefit of U.S. Provisional Patent Application Ser. No. 60/869,222, filed on Dec. 8, 2006, which is hereby incorporated by reference in its entirety.

INCORPORATION BY REFERENCE

Commonly owned U.S. patent application Ser. No. 11/474,517 and PCT Patent Application Serial No. PCT/US2006/0024631, both entitled "Real-Time Precision Ray Tracing" and both filed Jun. 23, 2006, are both incorporated herein by reference in their entireties.

Also incorporated by reference herein, by way of background, are the following United States patents and published patent applications, each of which is incorporated by reference in its entirety:

U.S. Pat. No. 7,030,878, assigned to VIA Technologies, Inc.;
U.S. Pat. No. 6,525,730, assigned to Autodesk Canada, Inc.;
U.S. Patent App. Pub. No. 2006/0158450, Ferguson et al.;
U.S. Patent App. Pub. No. 2006/0038822 and 2005/0206647, Xu et al.;
U.S. Patent App. Pub. No. 2005/0134588, assigned to Hybrid Graphics, Ltd.; and
U.S. Patent App. Pub. No. 2002/0089501, assigned to Discreet Logic, Inc. (now Autodesk).

FIELD OF THE INVENTION

The present invention relates generally to the computer graphics, and, more particularly, to methods, systems, arrangements and computer program products adapted for efficient and robust creation and processing of shadow volumes using hierarchical occlusion culling.

BACKGROUND OF THE INVENTION

An important aspect of achieving visually convincing images in computer graphics is the display of shadows in three-dimensional (3D) scenes. For hardware rendering, i.e., the rasterization of primitives using graphics hardware, two common standard methods are available: shadow mapping and stencil shadow volumes. (See, e.g., some of the patent applications and patents noted above by way of background incorporated by reference herein.) Each of these techniques has its advantages and drawbacks. Important among these is that shadow maps make creating soft shadows relatively easy, but suffer from aliasing problems, particularly in large scenes. Shadow volumes are rendered with pixel accuracy, but it is more difficult to handle light sources that are not perfect point lights or directional lights, and they require a certain quality of the meshes.

It would be desirable to provide new methods, systems, arrangements, and computer program products operable to make shadow volumes more general with respect to the meshes that can serve as occluding geometry, as well as for accelerating the technique, particularly for large and complex input scenes.

SUMMARY OF THE INVENTION

The present invention provides new methods, systems, arrangements, and computer program products operable in computer graphics systems to make shadow volumes more general with respect to the meshes that can serve as occluding geometry in such computer graphics systems, as well as for accelerating shadow volume techniques, particularly for large and complex input scenes.

The invention provides methods, apparatus and computer program products operable in computer graphics systems of the type adapted for rendering images for display on a human-perceptible display element, wherein the rendering comprises processing of data corresponding to triangles, each triangle having edges, vertices and an associated triangle plane, wherein the displaying comprises the display of shadows in three-dimensional (3D) scenes, and wherein the shadows are displayed (or can be stored for later display) in relation to a simulated light source.

In one aspect, the methods, apparatus and computer program products of the present invention, which are adapted for operation in computer graphics systems, comprise executing a shadow volume creation method, the shadow volume creation method comprising the following aspects, for each non-degenerated triangle used in image rendering:

(1) computing a parameter d of a triangle as the dot product between the surface normal and the direction from an arbitrary point on the triangle plane to the light source;
(2) creating shadow caps, the creating of shadow caps comprising:
   (a) if necessary, rendering the triangle to create a near cap of the shadow volume;
   (b) extending triangle vertices to infinity and inverting their orientation to render a far cap of the shadow volume, if necessary;
   (c) If d is negative, performing (a) and (b) with inverted vertex orientation to ensure correct ordering of shadow volume faces; and
(3) extruding to infinity each edge of the triangle for which the d parameter of a triangle being processed has a different sign than the d parameter for an adjacent triangle, and rendering the resulting quadrilateral, extruding also to infinity edges that do not have an adjacent triangle associated therewith, and again utilizing the positive or negative sign of parameter d to adjust vertex ordering.

Another aspect of the invention comprises methods, apparatus and computer program products adapted for use in computer graphics systems, and in particular for executing a bounding volume hierarchy (BVH) traversal method, the BVH method comprising:

(1) starting with the root node holding the entire scene, and recursively traversing:
(2) generating the shadow volume of the current node, the generating comprising generating the shadow volume of the bounding volume of the current node, instead of the actual volumes of the enclosed geometry;
(3) testing the generated volume for intersection with the viewing frustum; and if it does not intersect, skipping the children of this node; otherwise, performing, asynchronously, an occlusion query on the volume geometry, without writing to the stencil buffer; and depending on the query result, disregarding the children or recursively traverse; and
(4) when a leaf node is reached and its node shadow volume is found to be visible, rendering the actual geometry shadow volume into the stencil buffer.

In a further aspect of the invention, the shadow volume creation method further comprises a selected processing of a polygon mesh representation in conjunction with a simulated light source, wherein some surfaces represented by the polygon mesh representation face towards the simulated light source ("towards surfaces"), some surfaces represented by the polygon mesh representation face away from the simulated light source ("away surfaces"), and a number of edges are shared by or common to the towards surfaces and the away surfaces; and the selected processing comprises:

(1) first, extruding edges that do not have neighbor polygons;

(2) second, taking into account all polygons in the mesh, including polygon surfaces facing the simulated light source ("towards surfaces") and polygon surfaces facing away from the simulated light source ("away surfaces"), so as to extrude possible silhouette edges and enable creation of the shadow caps, the taking into account all polygons in the mesh comprising:

(a) extruding the "towards" surfaces to generate a first set of shadow volumes;

(b) extruding the "away" surfaces to generate a second set of shadow volumes; and (c) combining the first and second set of shadow volumes to form a correct resultant shadow volume for the entire mesh representation, wherein edges common to the towards and away surfaces are extruded twice, and the resulting sides close the shadow volumes of both the light-facing and the non-light-facing polygons.

Another aspect of the invention comprises handling degenerated triangles by applying the foregoing selected processing.

These and other aspects, practices, embodiments and examples of the present invention will be described in greater detail in the following Detailed Description, which is to be read in conjunction with the attached drawing figures.

BRIEF DESCRIPTION OF THE DRAWINGS

FIG. 1 shows a schematic block diagram of a shadow volume creation module and a bounding volume hierarchy (BVH) traversal module according to an aspect of the present invention, implemented within an exemplary digital processing apparatus.

FIGS. 8A-8C show a source code listing of a GLSL implementation of a volume generation geometry shader according to a further aspect of the present invention.

DETAILED DESCRIPTION OF THE INVENTION

Figure 2:
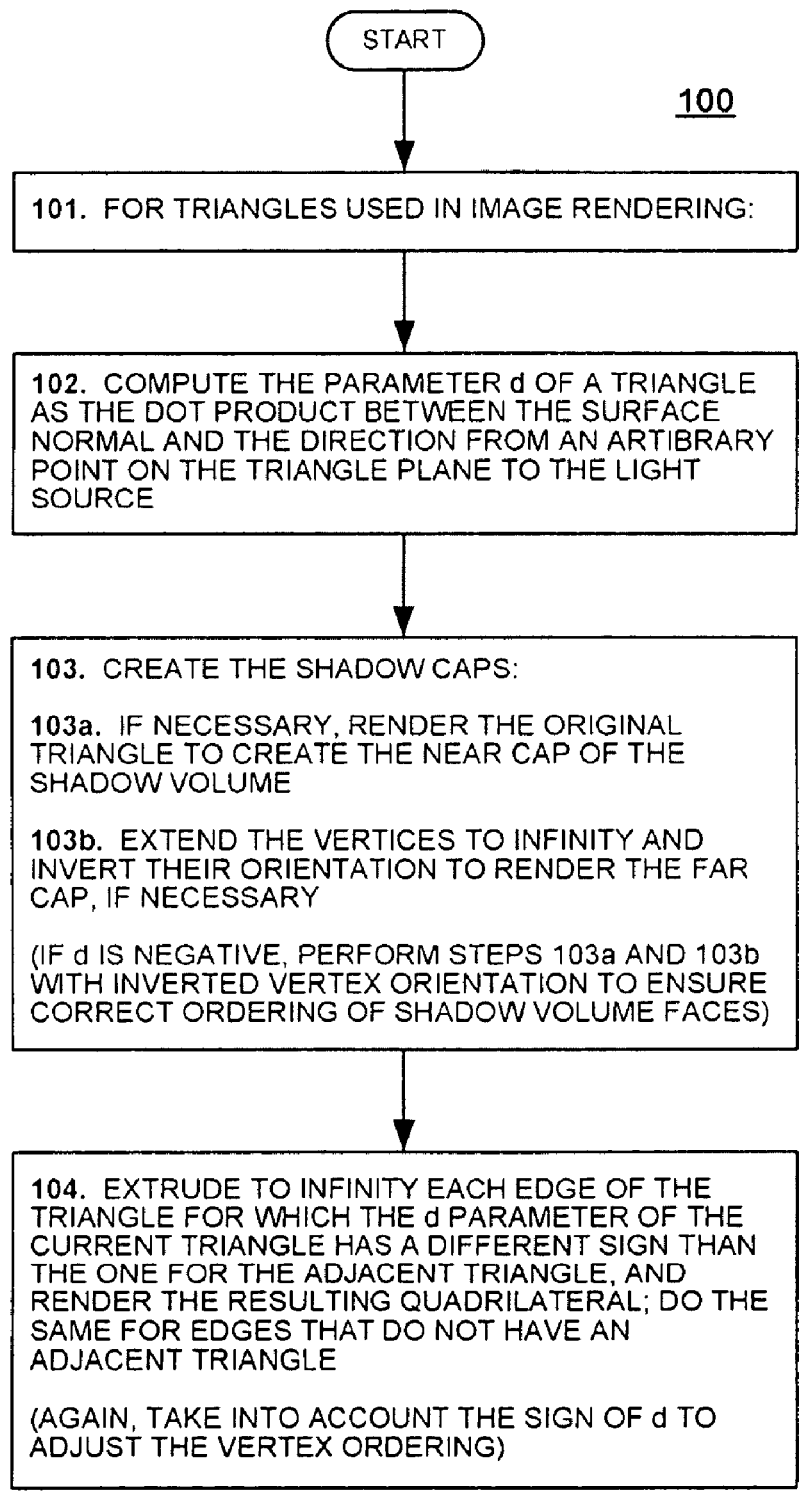
FIG. 2 shows a flowchart of a technique for shadow volume generation according to a further aspect of the invention.

Techniques according to various aspects of the present invention are described in detail in the following pages, taken in connection with the attached drawing figures. Those skilled in the art will appreciate that various additions, subtractions, and other modifications and implementations of the invention can be practiced, and are within the spirit and scope of the present invention.

As noted below, known forms of integrated circuit or semiconductor elements such as ASICs can be implemented in such a manner, using the teachings of the present invention described herein, to implement the described systems and techniques. FIG. 1 shows a schematic block diagram of a shadow volume creation module 10 and a bounding volume hierarch (BVH) traversal module 20 according to the present invention, implemented within a suitable digital processing apparatus 30. Examples of suitable digital processing environments in which the described aspects of the invention may be practice are described in Section 3.0 below, and illustrated in the drawing figures accompanying that section.

The following description of the invention is organized in the following sections:

1.0 Introduction
1.1 Shadow Volume Creation Technique
1.2 Bounding Volume Hierarchy Traversal
2.1 RealityServer Implementation
2.2 Overview of Shadow Volumes
2.2.1 Z-Pass and Z-Fail
2.2.2 Volume Generation
   2.2.2.1 Rendering Steps
   2.2.2.2 Rendering at Infinity
2.2.3 Performance and Optimizations
2.3 RealityServer Implementation
2.3.1 Robust Shadows for Low-Quality Meshes
   2.3.1.1 Modified Volume Generation Technique
   2.3.1.2 Performance Costs
2.3.2 Dynamic Volume Generation with Geometry Shaders
2.3.3 Improving Performance with Hierarchical Occlusion Culling
2.4 RealityServer Implementation: Conclusion
3.0 Digital Processing Environment in Which Invention Can Be Implemented 1.0 Introduction Described herein are techniques for making shadow volumes more general with respect to the meshes that can serve as occluding geometry, as well as for accelerating the technique especially for large and complex input scenes. The described techniques thus outperform previously known ones in terms of robustness, provided by the technique allowing the processing of inaccurate meshes at shadow volume creation time, and performance, provided by the new hierarchical, asynchronous occlusion query technique taking temporal coherence into account.

A "shadow volume" is the volume behind an object that is not reached by light rays of a given light source. The boundary of this volume can be rendered by extruding the silhouette edges of the occluder in the direction of the light and drawing the resulting quadrilaterals. With the graphics hardware options set up correctly during drawing, stencil buffer data is obtained, which can then easily be used to separate shadowed from unshadowed pixels during shading.

A "stencil buffer" is a block of memory with the same size as the frame buffer and a certain bit depth. On current graphics hardware, a stencil buffer is typically available at a resolution of eight bits. When rendering a primitive, the graphics hardware can be set up to perform certain operations on the values in the stencil buffer (increase, decrease, keep, zero, etc.), depending on whether the depth test passes or fails and depending on whether the rendered primitive is front-facing or back-facing. With stencil testing, the values in the stencil buffer can be used, e.g., to render pixels with a certain stencil value only.

After rendering shadow volumes only to the stencil buffer, but not to the color and depth buffer, the stencil buffer contains entries different from zero for shadowed regions and zero for unshadowed regions. Before rendering the shadow volumes, the stencil buffer must be initialized to zero and the depth buffer must contain the depth values of the scene. In many cases, a shadow volume extends to infinity, i.e., w=0 in homogeneous coordinates. Hence, the graphics hardware is set up so that geometry on the infinity plane is not clipped by the far clipping plane. If this option is not available on the given graphics card, a special projection matrix that leads to the same effect can be used, at the cost of some depth buffer accuracy.

Depending on whether the stencil buffer is modified on depth-pass or depth-fail, in some cases, the "caps" of the shadow volume need to be rendered. That is, the actual faces of the occluder, for the near cap, as well as those faces projected onto the infinity plane, for the far cap, have to be drawn. Several well-known standard techniques can be used to decrease the number of shadow volumes to be drawn or to the amount of pixel fill rate required, such as limiting the extent of the volumes for attenuated lights, view frustum culling of caps and/or silhouettes, and so on.

Conventional shadow volume techniques are used in application, such as games, where it is possible to manually edit and prepare the input geometry meshes. In that field, it is possible to constrain occluders to consist of closed, well-behaved triangle meshes, for which standard volume generation methods are well-suited.

1.1 Shadow Volume Creation Technique

Described herein is a technique for shadow volume generation that can handle arbitrary triangle data as occluders, including degenerate faces, random vertex orientation, non-closed meshes, and intersecting faces. This ability is important, e.g., for handling data generated by CAD systems, which tend to produce scenes with the aforementioned properties. FIG. 2 shows a flowchart of a technique 100 according to as aspect of the invention. The described technique proceeds as follows:

Box 101—For triangles used in image rendering:

Box 102—Compute the parameter d of a triangle as the dot product between the surface normal and the direction from an arbitrary point on the triangle plane to the light source.

Box 103—Create the shadow caps:

103a—If necessary, render the original triangle to create the near cap of the shadow volume.

103b—Extend the vertices to infinity and invert their orientation to render the far cap, if necessary.

(If d is negative, perform steps 103a and 103b with inverted vertex orientation to ensure correct ordering of shadow volume faces.)

Box 104—Extrude to infinity each edge of the triangle for which the d parameter of the current triangle has a different sign than the one for the adjacent triangle, and render the resulting quadrilateral. Do the same for edges that do not have an adjacent triangle. Again, take into account the sign of d to adjust the vertex ordering.

To reduce the number of unnecessary shadow volumes, well-behaved meshes can be detected and a standard technique for generating its shadow volume can be used. Conventional techniques typically take into account only polygons facing the light when extruding silhouettes and therefore do not work, e.g., for non-closed meshes.

It is possible to make use of the geometry shaders available on recent graphics hardware to speed up dynamic shadow volume generation. Geometry shaders allow the implantation of the above technique, as well as other shadow volume generation techniques, entirely on the GPU, since geometry primitives can be generated in a shader program.

Described below, in Section 2.3.1.1, is an enhancement of the technique, which provides for the case of degenerate triangles.

1.2 Bounding Volume Hierarchy Traversal

There is now described a technique for accelerating the use of shadow volumes, especially for scenes of high geometric complexity, such as architectural models or city scenes.

Figure 3:
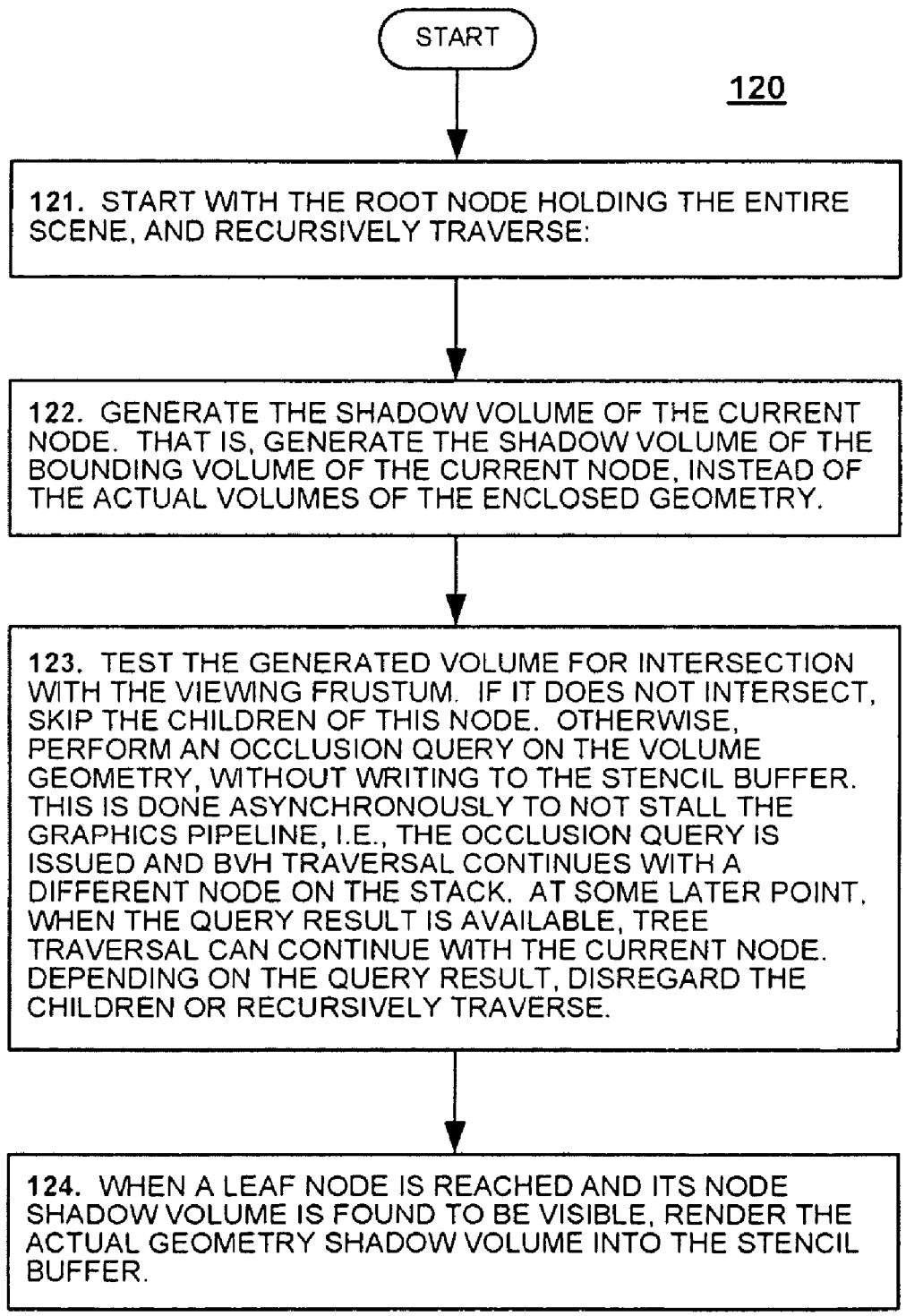
FIG. 3 shows a flowchart of a technique according to a further aspect of the invention for using a bounding volume hierarchy to accelerate the generation of shadow volumes.

FIG. 3 shows a flowchart of a technique 120 according to a presently described aspect of the invention. The basic approach of the described technique is to use hierarchical, hardware-accelerated occlusion culling on shadow volumes, to cut down the number of volumes that need to be rendered. A bounding volume hierarchy (BVH) is used as a hierarchical data structure of the objects (or sub-objects) in the scene. To draw the shadow volumes, the tree structure is traversed for each light source as follows:

Box 121—Start with the root node holding the entire scene, and recursively traverse:

Box 122—Generate the shadow volume of the current node. That is, generate the shadow volume of the bounding volume of the current node, instead of the actual volume(s) of the enclosed geometry.

Box 123—Test the generated volume for intersection with the viewing frustum. If it does not intersect, skip the children of this node. Otherwise, perform an occlusion query on the volume geometry, without writing to the stencil buffer. This is done asynchronously to not stall the graphics pipeline, i.e., the occlusion query is issued and BVH traversal continues with a different node on the stack. At some later point, when the query result is available, tree traversal can continue with the current node. Depending on the query result, disregard the children or recursively traverse.

Box 124—When a leaf node is reached and its node shadow volume is found to be visible, render the actual geometry shadow volume into the stencil buffer.

Because a BVH bounding volume fully encloses all of the objects contained in the node, an object in the node can only cast a visible shadow volume if the bounding volume shadow volume itself is visible. The special cases of (1) the light source being inside a node bounding volume and (2) the camera being inside a bounding volume shadow are handled by directly continuing with the children of such nodes. The presented approach reduces the number of rendered shadow volumes quite dramatically for many scenes.

Since occlusion queries are not cheap, even if done asynchronously, the above technique may be enhanced by taking into account temporal coherence during traversal. This allows the second and subsequent frames to render significantly faster compared to the first one. Temporal coherence is based on the assumption that the light sources, objects, and the viewer, move only slightly between subsequent frames, which is usually the case in most 3D applications. The technique is implemented as an extension to the BVH traversal technique mentioned above as follows: Besides the usual information (bounding volume, children pointer), each BVH node also stores coherency information, i.e., whether the node was visible last time it was checked and when the information was last updated. That information is then used to skip hardware occlusion queries for previously visible nodes. The technique can be readily extended with other criteria. To handle multiple light sources with a single BVH, each node contains a set of coherency information variables, one set for each light source.

Further aspects of the presently described acceleration technique are discussed below in Section 2.3.3.

2.1 RealityServer Implementation

The above-described techniques are now examined in greater depth with respect to RealityServer, commercially available from MENTAL IMAGES GMBH, which is a platform for creating and deploying 3D Web services and other applications.

The hardware renderer in RealityServer needs to be able to display a large variety of scenes with high performance and quality. An important aspect of achieving these kinds of convincing images is realistic shadow rendering.

RealityServer supports the two most common shadow-rendering techniques: shadow mapping and shadow volumes. As mentioned above, each technique has its own advantages and drawbacks. It's relatively easy to create soft shadows when shadow maps are used, but the shadows suffer from aliasing problems, especially in large scenes. On the other hand, shadow volumes are rendered with pixel accuracy, but they have more difficulty handling light sources that are not perfect point lights or directional lights.

The following description explains how robust stencil shadow rendering is implemented in RealityServer and how state-of-the-art hardware features are used to accelerate the technique.

2.2 An Overview of Shadow Volumes

The idea of rendering shadows with shadow volumes has been around for some time, but it became practical only relatively recently with the development of robust techniques and enhanced graphics hardware support. The basic principles of the approach are briefly described hereinbelow.

2.2.1 Z-Pass and Z-Fail

Figure 4A:
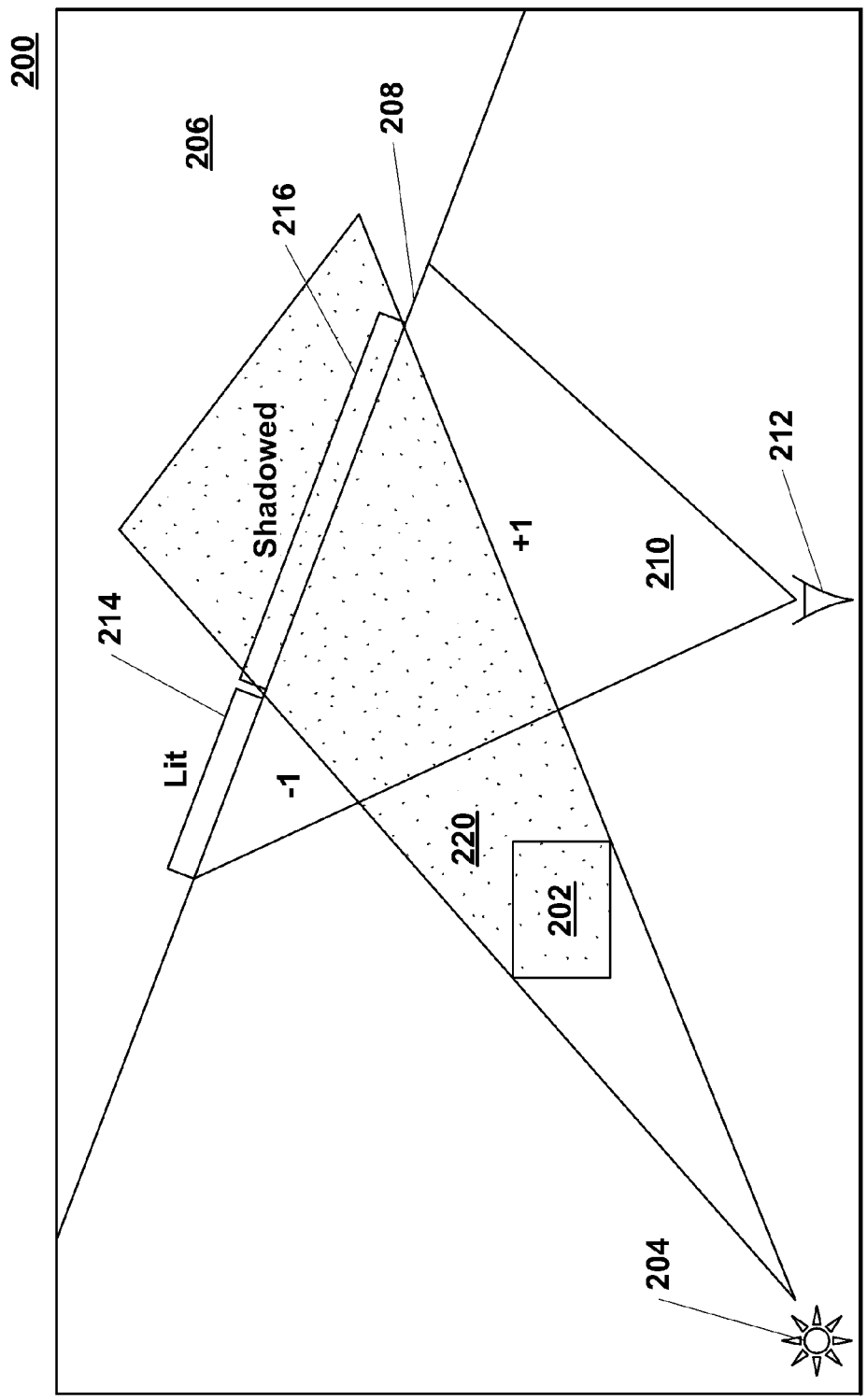
FIGS. 4A-4C are a series of diagrams illustrating the z-pass and z-fail techniques for rasterizing shadow volumes.
Figure 4B:
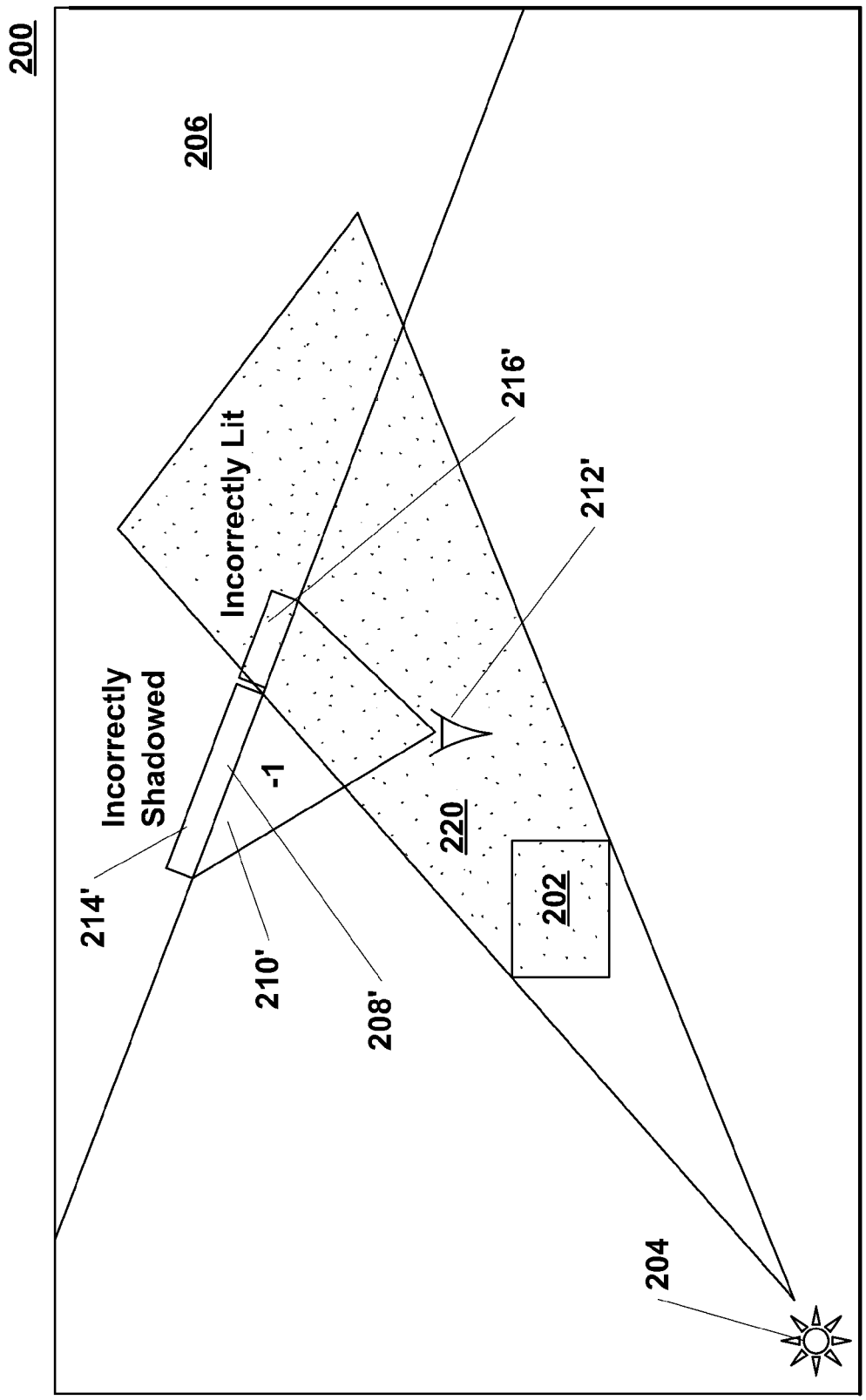
Figure 4C:
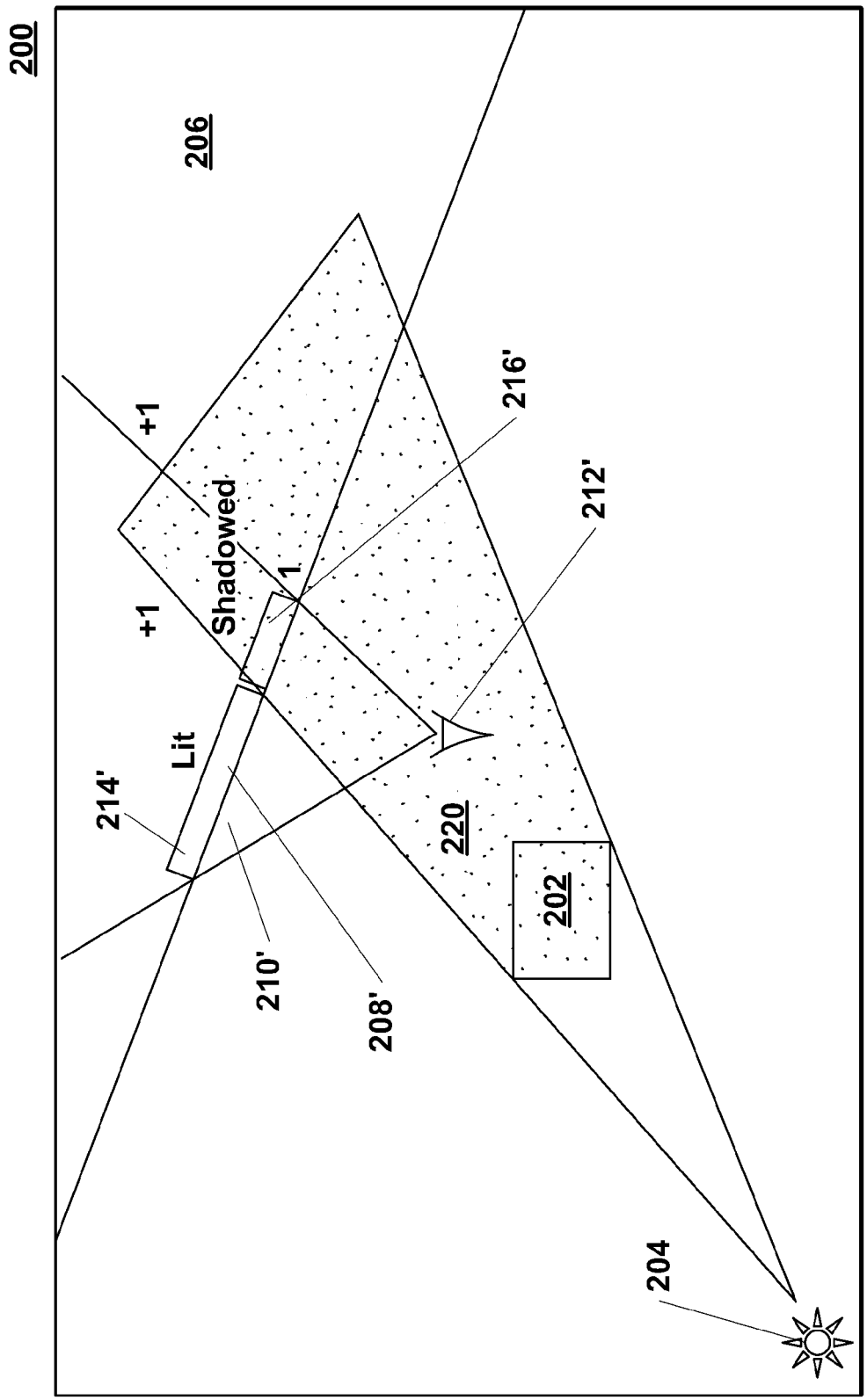

FIGS. 4A-4C are a series of diagrams illustrating the main ideas behind shadow volumes. FIG. 4A illustrates a scene 200, in which an occluder 202 is positioned between a light source 204 and a receiving surface 206. A portion of receiving surface 208 lies within the visible frustum 210 of a camera 212. The visible portion of the receiving surface 206 includes a lit region 214 and a shadowed region 216.

The actual shadow volume of the occluder 202 corresponds to shaded area 220, i.e., all points behind the occluder 202 that are not visible from the light source 204. It is clearly desirable to render all geometry that intersects the shadow without lighting, or only with ambient lighting, while everything outside the volume would receive the full contribution of the light source.

Consider a ray with its origin at the camera cast, toward the scene geometry, as illustrated in FIG. 4A. The ray's intersections with the shadow volume 220 are counted. At each entry into the shadow volume 220, a counter is increased, and at each exit the counter is decreased. For only the parts of the geometry in shadow, the result is a counter value different from zero. That concept is an important principle behind shadow volumes. If the counter value is available for each pixel, shadowed areas have been separated from non-shadowed areas, and it is possible to use a multiple pass rendering technique to exploit that information.

To obtain the counter values, it is not necessary to perform "real" ray tracing. It is possible to rely on the stencil functionality typically available in currently available graphics hardware. First, the stencil buffer is cleared by setting it to zero. Then, the boundary of the shadow volume is rendered into the stencil buffer, not into the color and depth buffer. The hardware is set up so that the value in the stencil buffer is increased on front-facing polygons and decreased on back-facing polygons. The increasing and the decreasing operations are both set to "wrap around." Thus, decreasing zero and increasing the maximum stencil value do not result in saturation.

As a result of this pass, the stencil buffer will contain the intersection counter value for each pixel, which is zero for all non-shadowed pixels, and non-zero for all shadowed pixels. On current graphics cards, volume rendering can be performed in a single render pass by using two-sided stencil writing, which is controlled in OpenGL with the glStencilOpSeparate( ) function. Before the shadow volumes are drawn, the z-buffer must be filled with the scene's depth values, which is usually the case because an ambient pass has to be rendered anyway.

It should be noted that the stencil writes must be performed for every fragment for which the depth test passes. Hence, the method just described is called "z-pass." Z-pass is a straightforward technique, but there is a problem with it, illustrated in FIG. 4B. FIG. 4B shows the occluder 202, light source 204, and receiving surface 206 of FIG. 4A. However, the position of the camera 212' has been modified so that it is now located within the shadow volume 220. The change in position of the camera 212' results in a change in the position of the viewing frustum 210', the viewable portion 208' of receiving surface 206, including the lit portion 214' and the shadowed portion 216'. The z-pass technique yields incorrect results, because there is no entry point into the shadow volume 220. Thus, if there is no shadow volume exit point between the camera and the receiving surface, the counter will remain at zero, and a region that should be shadowed will instead be lit. If there is a shadow volume exit point between the camera and the receiving surface, the counter will be decreased to a non-zero volume, and a region that should be lit will instead be shadowed.

A solution has been developed: instead of counting the ray-volume intersections in front of the actual geometry, it is possible to count the intersections behind it, as shown in FIG. 4C. All that has to be done is to set up the graphics hardware to write to the stencil buffer if the depth test fails, and invert the increasing and decreasing operations. This technique is generally referred to as "z-fail."

Z-fail works for any case, but unlike z-pass, it must be assured that the volume caps are correctly rendered; that is, the volume must be closed both at its front end and at its back end. As illustrated in FIG. 4C, a missing back cap would give incorrect results.

For z-pass, the front cap does not need to be drawn because the depth test would fail, resulting in no stencil write anyway. The back cap can be omitted because it is placed at infinity behind all objects, so it would fail any depth test as well.

2.2.2 Volume Generation

There is described above, in Section 1.1, a technique according to an aspect of the present invention for generating shadow volumes. The described technique typically works correctly only for closed two-manifold polygon meshes, meaning that objects cannot have holes, cracks, or self-intersections. Described below in Section 2.3.1.1 is a technique according to a further aspect of the invention that overcomes these restrictions.

2.2.1 Rendering Steps

As described above in Section 1.1 and illustrated in FIG. 2, the rendering of the shadow volumes may be broken down into the following three steps:
1. Rendering the front cap;
2. Rendering the back cap; and
3. Rendering the object's extruded silhouette, i.e., the sides of the volume For the front cap, all the polygons in the model are looped over, and the ones that face the light are rendered. Whether a polygon faces the light or not can be checked efficiently by testing the sign of the dot product between the face normal and the direction to the light. For the back cap, the same polygons again are rendered again, with all the vertices projected to infinity in the direction of the light. This projection method is also used for the volume sides, where the possible silhouette edges are drawn extruded to infinity, resulting in quads. The possible silhouette edges, i.e., the edges that may be part of the actual occluder silhouette, are found by comparing the signs of the dot products between the surface normal and the direction to the light with those of the neighboring faces.

If the signs differ, the edge is extruded. For non-convex objects, this extrusion can result in nested silhouettes, which do not break shadow rendering. Yet it is important that in all cases, the generated faces are oriented so that their normal points outside the shadow volume; otherwise, the values in the stencil buffer will get out of balance.

2.2.2 Rendering at Infinity

Rendering at infinity is intrinsic to homogeneous coordinates in OpenGL (and Direct3D as well). A vertex can be rendered as if it were projected onto an infinitely large sphere by passing a direction instead of a position. In the present case, this direction is the vector from the light position toward the vertex. In homogeneous coordinates, directions are specified by setting the w component to zero, whereas positions usually have w set to one.

When rendering at infinity, an issue arises that primitives will be clipped against the far plane. A convenient way to counteract this clipping is to use depth clamping, which is supported by the NV_depth_clamp extension in OpenGL. When enabled, geometry is rendered even behind the far plane and produces the maximum possible depth value there. If the extension is not available, a special projection matrix may be used to achieve the same effect.

2.2.3 Performance and Optimizations

For reasonably complex scenes, shadow volumes can cost a lot of performance. Thus, many optimizations have been developed. It is noted that z-pass usually performs faster than z-fail, mainly because it is not necessary to render the volume caps. In addition, the occluded part of the shadow volume is usually larger on screen than the non-occluded part, which makes z-fail consume more fill rate. It therefore makes sense to use z-pass whenever possible and switch to z-fail only when necessary, i.e., when the camera is inside the shadow volume.

Z-pass and z-fail can be used simultaneously in a render pass, and it pays off to dynamically switch between the two, requiring only a conservative test whether the camera is inside a volume. Fill rate may be the main bottleneck for shadow volumes; accordingly, further optimizations include volume culling, limiting volumes using the scissor test, and depth bounds.

2.3 RealityServer Implementation

There are now described techniques according to aspects of the present invention for improving robustness and performance. In particular, there are now describe techniques to make shadow volumes meet the requirements of RealityServer.

2.3.1 Robust Shadows for Low-Quality Meshes

Shadow volume techniques are commonly used in applications such as games, where the artist has full control over the meshes the game engine has to process. Hence, it is often possible to constrain occluders to be two-manifold meshes, which simplifies shadow volume generation. However, RealityServer needs to be able to correctly handle meshes of low quality, such as meshes that are not closed or that have intersecting geometry. These kinds of meshes are often generated by CAD software or conversion tools. It is therefore desirable to lower the constraints on meshes for which artifact-free shadows are rendered, without sacrificing too much performance.

2.3.1.1 A Modified Volume Generation Technique

Figure 5:
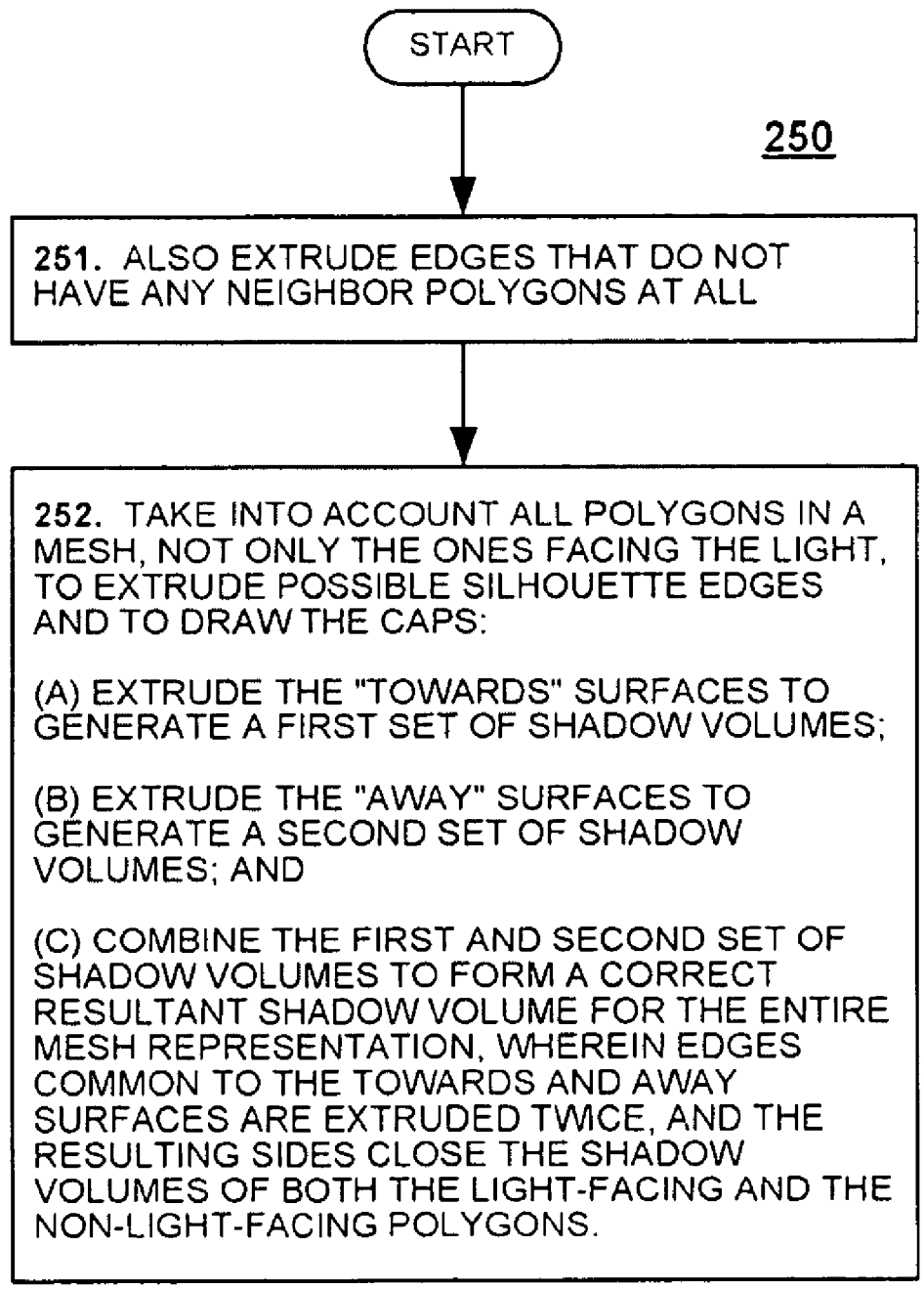
FIG. 5 shows a flowchart of an extension of the technique illustrated in FIG. 2, according to a further aspect of the invention.

FIG. 5 shows a flowchart of a modification 250 to the above-described volume generation technique. In that approach, in addition to drawing the caps, an edge of a polygon facing the light was extruded whenever its corresponding neighbor polygon did not face the light.

To work robustly for non-two-manifolds, the technique is extended in two ways:

Box 251—First, edges are extruded that do not have any neighbor polygons at all. This extension is needed for non-closed meshes. An example of a non-closed mesh is where just a single triangle is an occluder, for example.

Box 252—Second, all the polygons in a mesh are taken into account, not only the ones facing the light, to extrude possible silhouette edges and to draw the caps. This extension means that all silhouette edges that have a neighbor polygon are actually extruded twice, once for each connected polygon, and includes the following:

(a) extrude the "towards" surfaces to generate a first set of shadow volumes;

(b) extrude the "away" surfaces to generate a second set of shadow volumes; and (c) combine the first and second set of shadow volumes to form a correct resultant shadow volume for the entire mesh representation, wherein edges common to the towards and away surfaces are extruded twice, and the resulting sides close the shadow volumes of both the light-facing and the non-light-facing polygons.

Figure 6A:
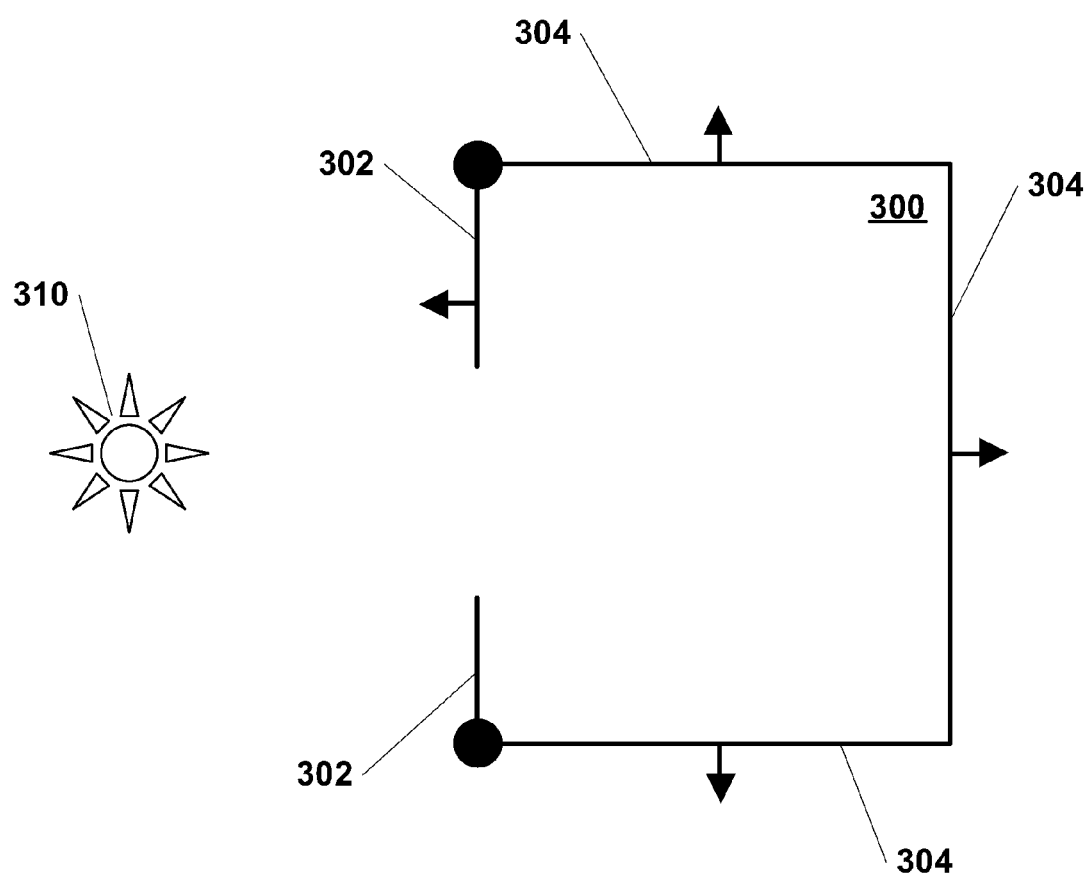
FIGS. 6A-6C are a series of diagrams illustrating the technique shown in FIG. 5.
Figure 6B:
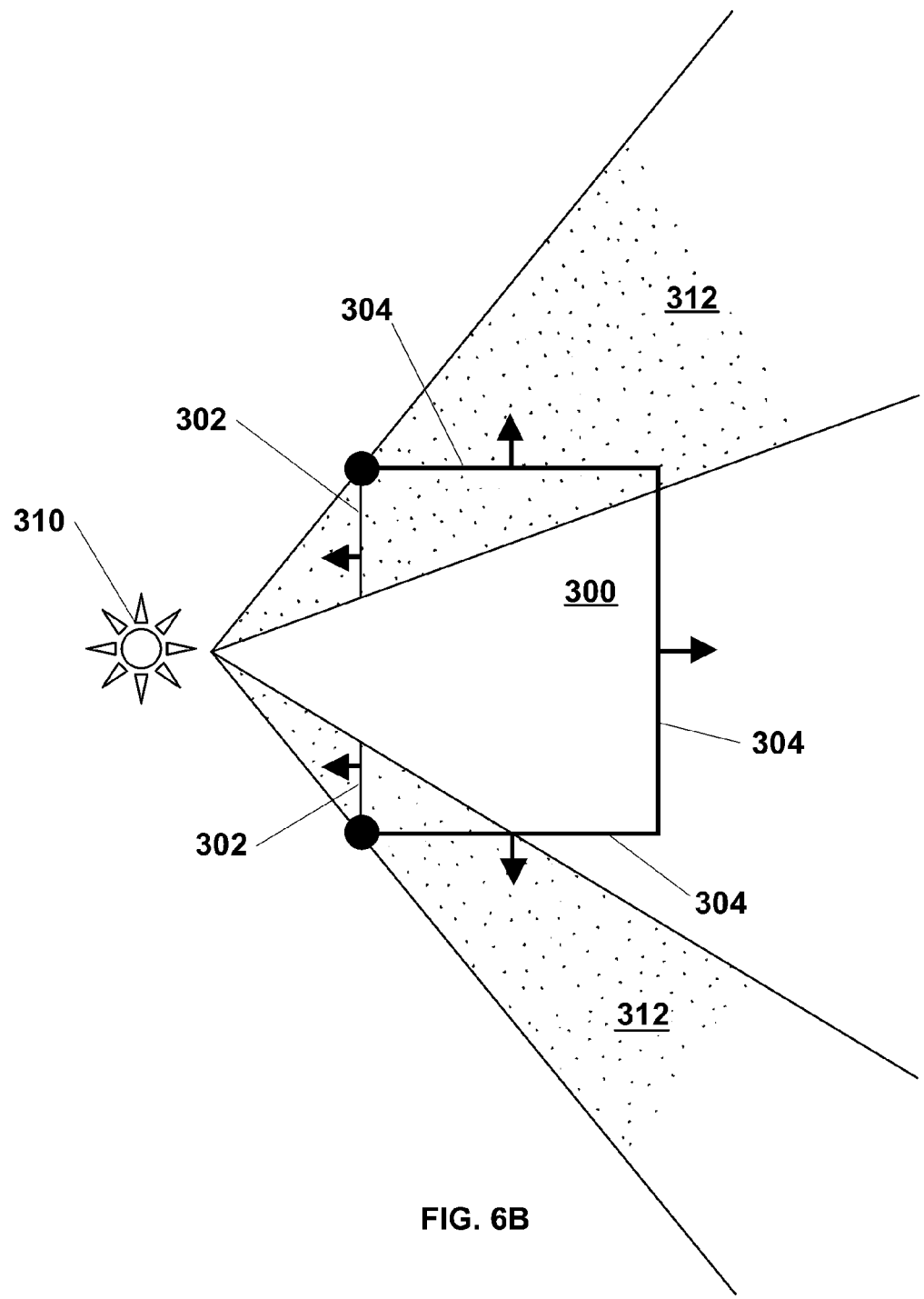
Figure 6C:
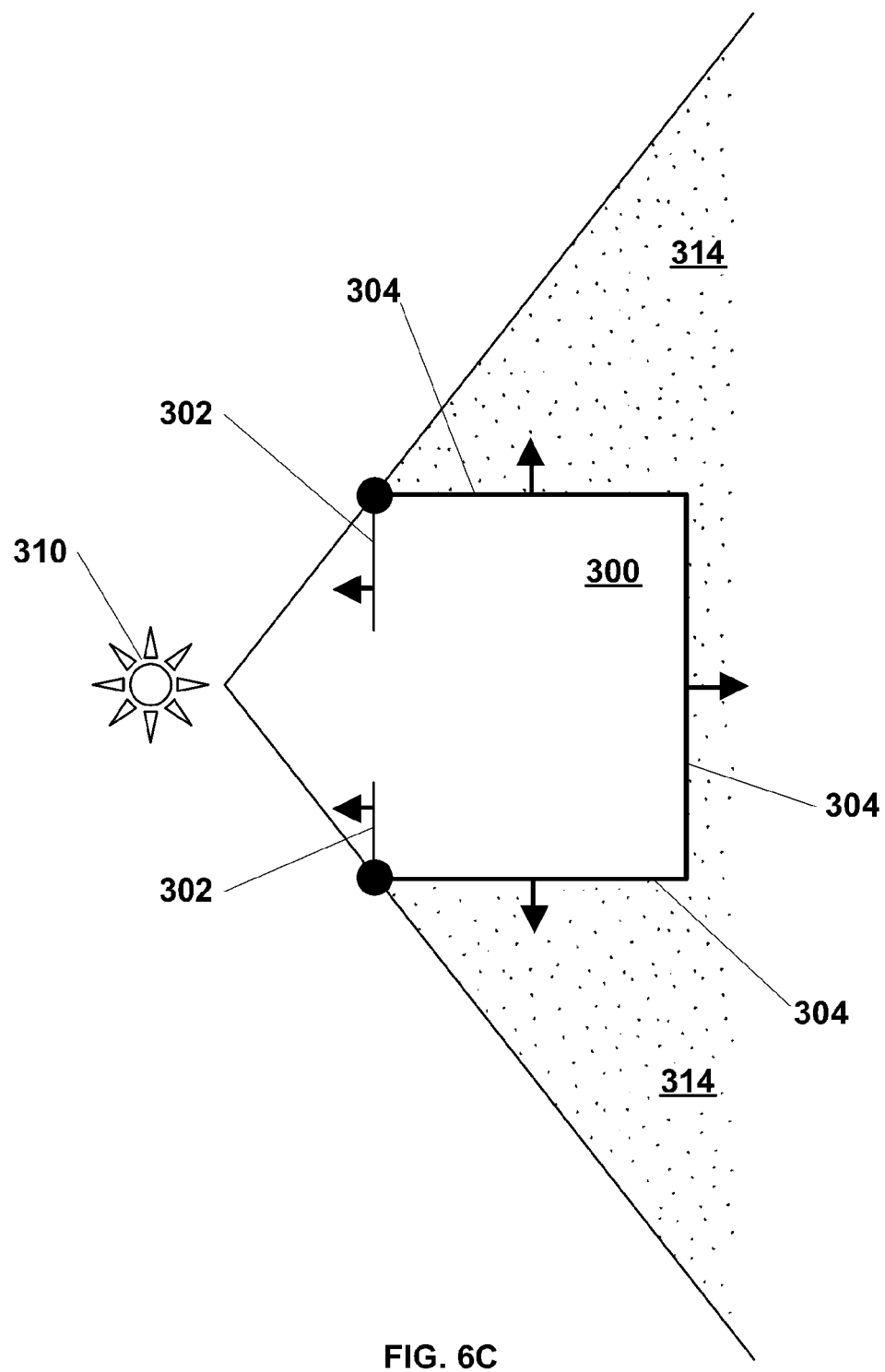

These extensions are illustrated in FIGS. 6A-6C. FIG. 6A shows a diagram of an occluder 300 formed from an open mesh. The open mesh includes a number of surfaces 302 that face towards the light source 310, and a number of surfaces 304 that face away from the light source 310. The open mesh further includes a number of edges 306 that are shared by both "towards" surfaces 302 and "away" surfaces 304.

In a first step, illustrated in FIG. 6B, a first set of shadow volumes 312 is generated by extruding the "towards" surfaces 302. In a second step, a second set of shadow volumes 314 is generated by extruding the "away" surfaces 304. The first and second sets of shadow volumes 312 and 314 are then combined to form correct shadow volume for the entire mesh 300. As discussed above, edges 306 are common to the "towards" and "away" surfaces are extruded twice.

The shadow volume for this open mesh 300 is rendered correctly, because the "common" edges 306 are extruded twice. The resulting sides close the shadow volumes of both the light-facing and the non-light-facing polygon sets.

It should be noted that the order of extruding shadow volumes from the "towards" and "away" surfaces may be reversed. Also, suitable hardware may be developed that alls the "towards" and "away" shadow volumes to be extruded simultaneously.

The presently described technique can be understood as a technique that divides an object into multiple parts, with each part consisting of only front-facing or back-facing polygons with respect to the light source. Then for each part, the corresponding shadow volume is rendered, similar to multiple separate objects behind each other. This technique even works for self-intersecting objects. As before, careful attention must be paid that all shadow volume geometry is oriented correctly, i.e., with the normal pointing out of the volume. Now that polygons not facing the light are also considered, it is necessary to invert all the generated volume faces on these polygons.

2.3.1.2 Performance Costs

The new approach is simple and effective, but it comes at a cost. If, for example, a two-manifold mesh is being rendered, twice the work of the non-robust technique is being done. For z-fail, the caps are rendered twice instead of once, i.e., for the front and the back faces; all the possible silhouette edges are extruded twice as well. However, the caps are generally not too much of an issue, because for most scenes, only a few occluders will need to be handled with z-fail. Remember that for z-pass, it is not necessary to draw any caps at all.

A bigger issue is that there is twice the number of extruded silhouette edges. One simple solution would be to extrude and render edges connected to two faces only once, and increase or decrease the value in the stencil buffer by 2 instead of 1. For z-pass, this would bring down the cost of the technique to be the same as for the non-robust method. However, this functionality is not supported in graphics hardware, so it is not possible to get around rendering those edges twice. To minimize the unavoidable performance loss, the presently described technique detects if a mesh is two-manifold in a preprocessing step and employs the robust volume generation only if necessary.

Also, it should be noted that there are still cases that are not handled by our implementation; in particular, more than two polygons sharing an edge, and polygons that share an edge but have different vertex winding order. This, as well, is handled during preprocessing, where such cases are converted into single, disconnected polygons.

Even though dealing with difficult meshes in combination with shadow volumes sounds challenging at first, it should be relatively straightforward to integrate the presented method in any existing stencil shadow system. For RealityServer, robust shadows are a must, even if they come at the cost of some performance, because it is typically difficult, if not impossible, to correct the meshes the application has to handle.

2.3.2 Dynamic Volume Generation with Geometry Shaders

NVIDIA's GeForce 8 class hardware enables programmable primitive creation on the GPU in a new pipeline stage called the geometry shader (GS). Geometry shaders operate on primitives and are logically placed between the vertex shade (VS) and the fragment shader (FS). The vertices of an entire primitive are available as input parameters.

This new capability is well suited for the dynamic creation of shadow volumes. Silhouette determination is not a cheap task and must be redone every frame for animated scenes. It is therefore preferable to move the computational load from the CPU to the GPU. Previous approaches to creating shadow volumes entirely on the GPU have typically required intricate techniques using with vertex and fragment shaders. Now, geometry shaders provide a "natural" solution to this problem. A basic geometry shader (GS) reproducing the fixed-function pipeline would just take the input primitive and emit it again, in the present case generating the front cap of a shadow volume. Additional primitives will then be created for the back cap and extruded silhouette edges, as needed. The exact same robust technique as described above in Section 2.3.1.1 can be implemented entire on the GPU, leading to an elegant way to create dynamic shadows.

Figure 7:
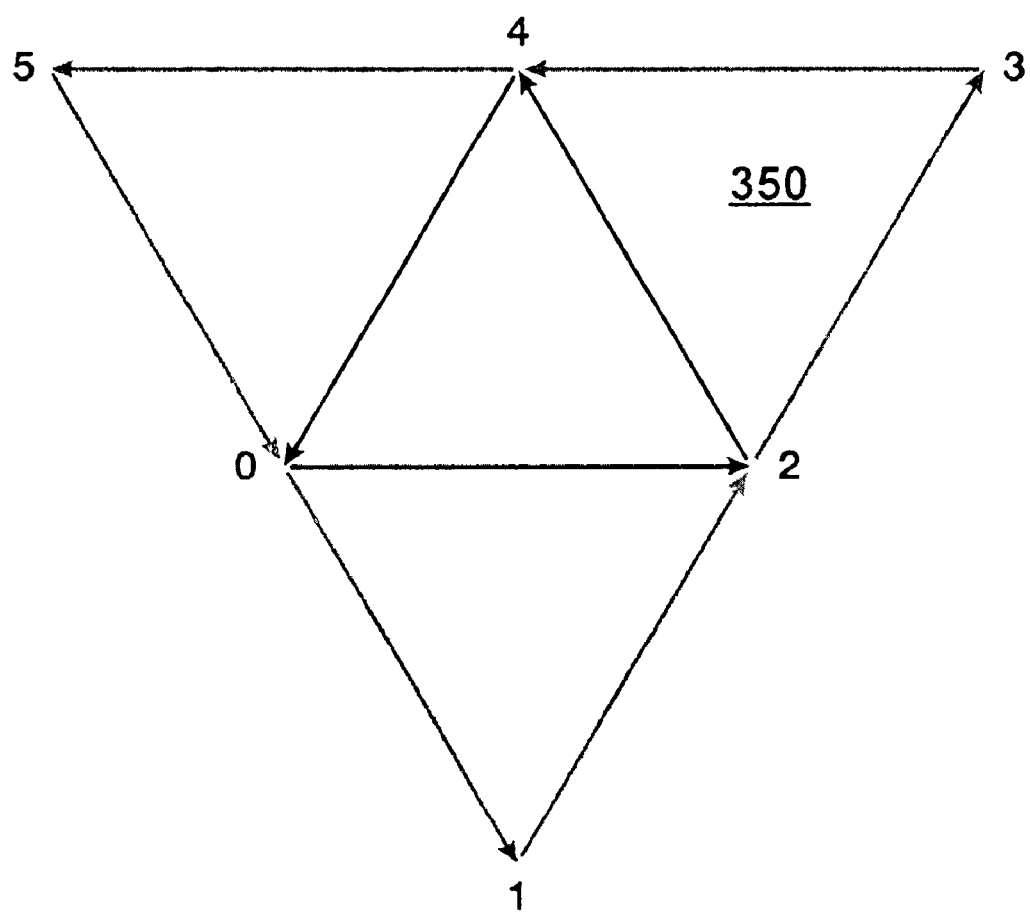
FIG. 7 is a diagram illustrating a vertex layout of a triangle with neighbors.

To compute the silhouette edges of a mesh, the geometry shader has to have access to adjacency information of triangles. In OpenGL, we can pass in additional vertices per triangle using the new GL_TRIANGLES_ADJACENCY_EXT mode for glBegin. In this mode six vertices are needed, instead of three, to complete a triangle, three of which specify the neighbor vertices of the edges. FIG. 7 is a diagram illustrating a vertex layout 350 of a triangle with neighbors. The main triangle comprises vertices 0, 2, and 4. The vertices 1, 3 and 5 specify the neighbors of the first, second, and third edge of the main triangle, respectively.

In addition to specifying the input primitive type, it is necessary to specify the type of primitive a GS will create. Triangle strips are chosen, which allows the efficient rendering of single triangles (for the caps), as well as quads (for the extruded silhouette edges). The maximum allowed number of emitted vertices will be set to 18 (3+3 for the two caps plus 4×3 for the sides).

FIGS. 8A-8C show a source code listing 400a-c of a GLSL implementation of the volume generation geometry shader. The code assumes that gl_PositionIn contains the coordinates of the vertices transformed to eye space. This transformation is done in the VS simply by multiplying the input vertex with gl_ModelViewMatrix and writing it to gl_Position. All the vertices of a primitive will then show up in the gl_PositionIn array. If an edge does not have a neighbor triangle, we encode this by setting w to zero for the corresponding adjacency vertex.

One issue to be addressed at this point is to transform the actual rendered scene geometry exactly like the geometry in the shadow volume shader. That is, if ftransform or the fixed-function pipeline is used for rendering, it will probably be necessary to adjust the implementation so that at least the front caps use coordinates transformed with f trans form as well. Otherwise, shadow artifacts ("shadow acne") caused by z-fighting may result. The parameter 1_pos contains the light position in eye space, in 4D homogeneous coordinates. This makes it easy to pass in point lights and directional lights without having to handle each case separately.

The uniform variable robust controls whether or not we need to generate volumes with the technique described above in Section 2.3.1.1. If a mesh is known to be a two-manifold, robust can be set to false, in which case the shader simply ignores all polygons not facing the light. This means the system effectively switches to the volume generation technique described above in Section 2.2.1. The zpass flag specifies whether the z-pass method can be used safely. This decision is determined at runtime by checking if the camera is inside the shadow volume. According to a further aspect of the invention, a conservative check is run, using a coarser bounding volume than the exact shadow volume. If so, z-fail needs to be used; otherwise, the shader can skip rendering the front and back caps.

It should be noted that the code also addresses an issue that frequently arises with low-quality meshes: degenerate triangles. A triangle can either be degenerate from the beginning or become degenerate when being transformed to eye space, due to numerical inaccuracies in the computations. Often, this happens with meshes that have been tessellated to polygons and contain very small or very thin triangles. Degenerate, or nearly degenerate, triangles are a thorny problem in shadow volume generation because the artifacts they cause are typically not only visible in the shadow itself, but also show up as shadow streaks "leaking" out of the occluder.

The main difficulty with degenerate triangles is to decide whether or not they face the light. Depending on the normal is computed that is later compared to the light direction, different conclusions may be reached. Problems then arise if, as in a geometry shader, it is necessary to look at the same triangle multiple times. What is the "main" triangle at one point can be a "neighbor" triangle at another point. If two such runs do not yield the same result, there may be one extruded silhouette too many, or one too few, which may lead to artifacts.

To handle this problem, it is made sure that exactly the same computations are performed whenever it is necessary to decide whether a triangle faces the light or not. Unfortunately, this solution leads to computing three normals per triangle and comparing them to three different light direction vectors. This operation, of course, costs some performance. It might therefore be desirable to go back to a less solid implementation if it is known that only meshes without "difficult" triangles will be handled.

2.3.3 Improving Performance with Hierarchical Occlusion Culling

Shadow volumes were integrated into RealityServer mainly for use in large scenes, such as city models, where shadow maps typically do not perform well. In such scenes, rendering performance can be increased significantly by using a hierarchical occlusion culling method.

The idea is to organize all objects in the scene in a hierarchical tree structure. During rendering, the tree is recursively traversed in a front-to-back order, and the objects contained in the leaf nodes are rendered. Before a tree node is traversed, however, it is tested for visibility using the occlusion culling feature provided by the graphics hardware. If the node is found to be invisible, the entire subtree can be pruned. The simplest hierarchical structure to use in this case is a binary bounding-volume hierarchy (BVH) of axis-aligned abounding boxes (AABBs). This kind of hierarchy is extremely fast to generate, which is important for animated scenes, where the BVH (or parts of it) needs to be rebuilt every frame.

To check whether a node is visible, it can first be tested against intersection with the viewing frustum and then perform an occlusion query simply by rendering the AABB. Only if it is actually visible does the system continue tree traversal or render the leaf content, respectively.

To optically exploit the hierarchical occlusion culling technique, use should be made of asynchronous occlusion queries and temporal coherence. Because occlusion queries require a readback from the GPU, they have a relatively large overhead. Thus, it is possible to issue an asynchronous occlusion query and continue traversal at some other point in the tree until the query result is available. Storing information about whether or not a node was visible in the previous frame helps establish whether an occlusion query is required at all, or whether it may be faster to just traverse the node without a query. For example, if a node was visible in the previous frame, it may be assumed that the likelihood of the node being visible in the present frame is sufficiently high to forgo an occlusion query. If a node was not visible in the previous frame, it may be assumed that the likelihood of the node being visible in the present frame is sufficiently low to make an occlusion query worthwhile.

According to a further aspect of the invention, this approach is extended to shadow volumes as well. It is desired to find out if a certain node in the tree can be skipped because it is known that no object in this part of the hierarchy will cast a visible shadow. Instead of testing the bounding box of the node with an occlusion query, the bounding box extruded in the light direction is tested, as if the axis-aligned bounding box (AABB) itself would cast a shadow. In other words, the system effectively performs occlusion culling on the shadow volumes of the node bounding boxes. If this extruded box is not visible, it means that any shadow cast by an object inside the bounding box cannot be visible, and the node can be disregarded.

Figure 9A:
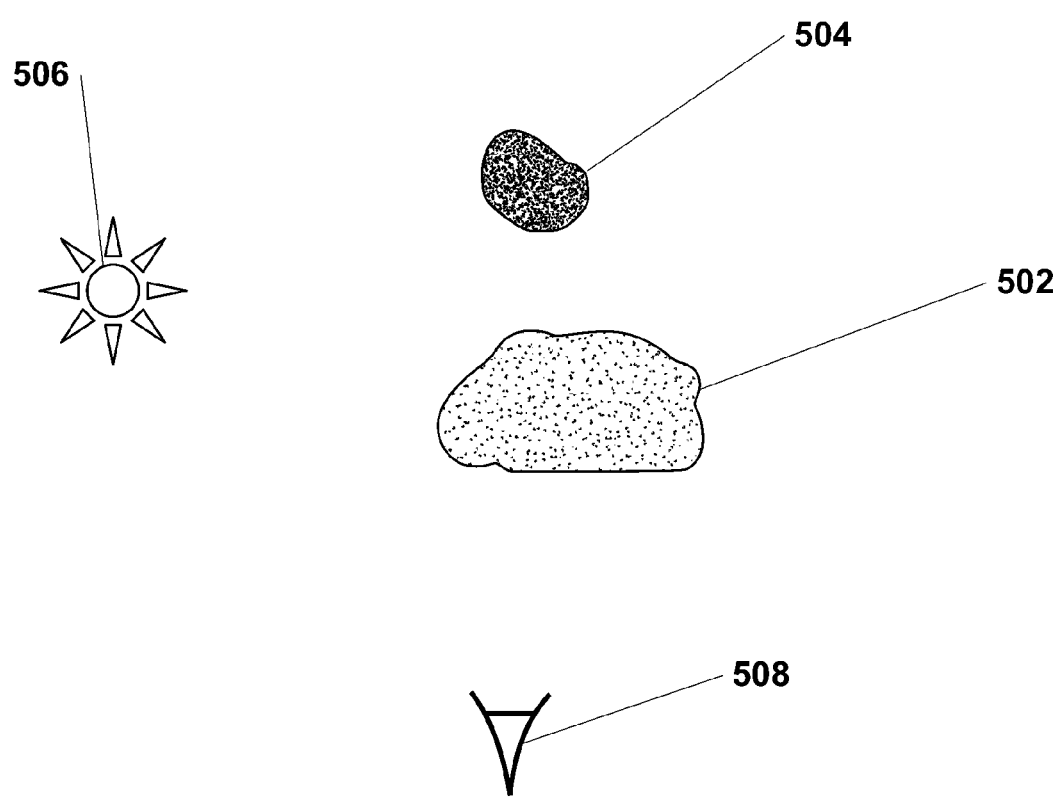
FIGS. 9A-9E are a series of diagrams illustrating a hierarchical occlusion culling technique according to a further aspect of the invention.
Figure 9B:
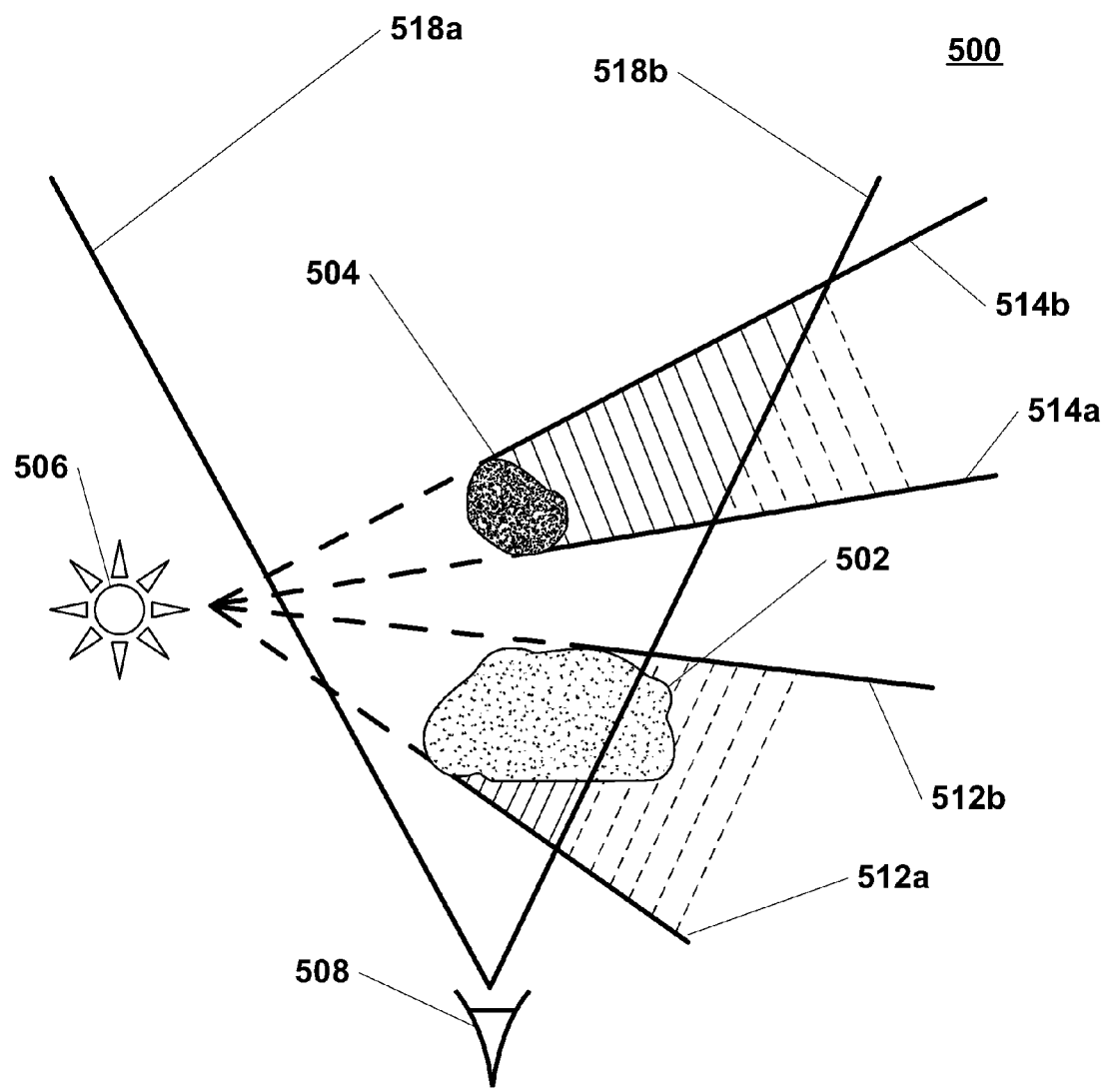

This principle is illustrated in FIGS. 9A-9E. FIG. 9A shows a diagram of an exemplary scene 500, including a first occluder 502, a second occluder 504, a light source 506, and a camera 508. For the purposes of the present discussion, it is assumed that shadow volume rendering is potentially expensive for each of the two occluders 502 and 504. In FIG. 9B, lines 512a and 512b have been added to illustrate the shadow volume of the first occluder 502 and the light source 506, and lines 514a and 514b have been added to illustrate the shadow volume of the second occluder 504. In addition, lines 518a and 518b have been added to illustrate an exemplary viewing frustum.

As illustrated in FIG. 9B, the second occluder 504 is completely hidden from view by the first occluder 502. As further illustrated is FIG. 9B, within the viewing frustum 518a-518b, the shadow volume of the second occluder 504 is also completely hidden from view. Thus, in the present example, there is no need to render either the second occluder 504 or its shadow volume.

As described above, an aspect of the present invention provides an efficient technique for performing an occlusion query to allow the renderer to skip the rendering of both occluder 504 and its shadow volume 514a-514b. According to the described technique, the second occluder 504 is enclosed in an axis-aligned bounding box (AABB). The AABB is then extruded to create a "trial" shadow volume. The system then determines whether any of the trial shadow volume is visible, or whether it is completely hidden from view by the first occluder 502.

Figure 9C:
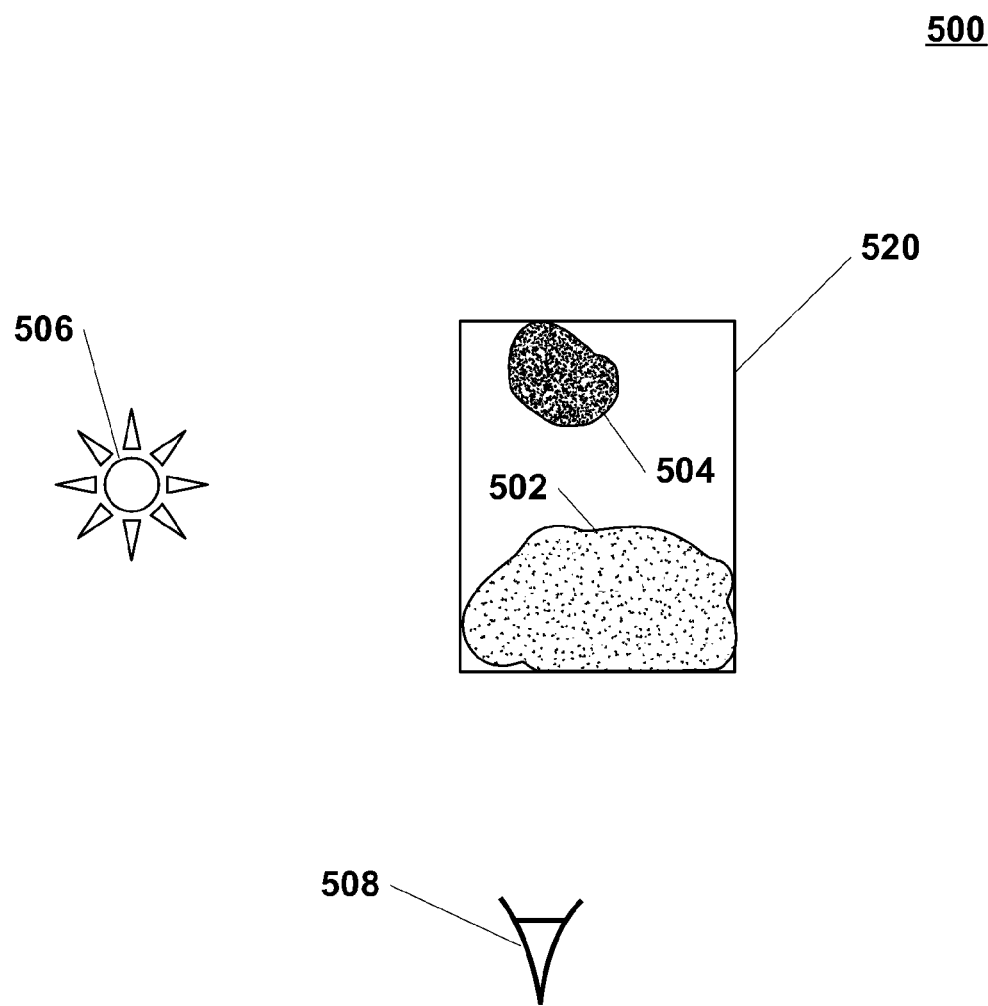
Figure 9D:
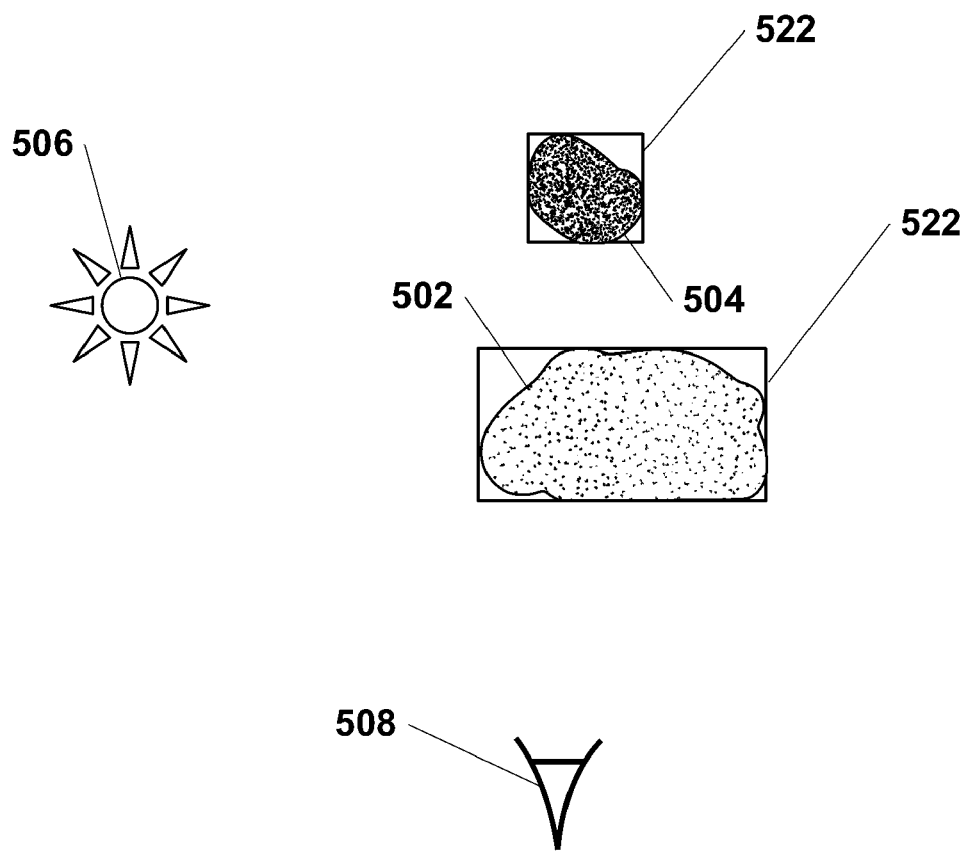

The generation of axis-aligned bounding boxes proceeds hierarchically. As illustrated in FIG. 9C, a first generation axis-aligned bounding box (AABB) 520 is first constructed around both the first and second occluders 502 and 504. The AABB is constructed by passing axis-aligned planes through the nearest and farthest points of the pair of occluders 502 and 504 along the x-, y-, and z-axes. As shown in FIG. 9D, the first generation AABB 520 is then subdivided into a pair of second generation AABBs, each of which contains a single occluder 502, 504. For each occluder 502, 504, a second generation AABB 522 is constructed by passing axis-aligned planes through the nearest and farthest points of each occluder 502, 504 along the x-, y-, and z-axes.

Figure 9E:
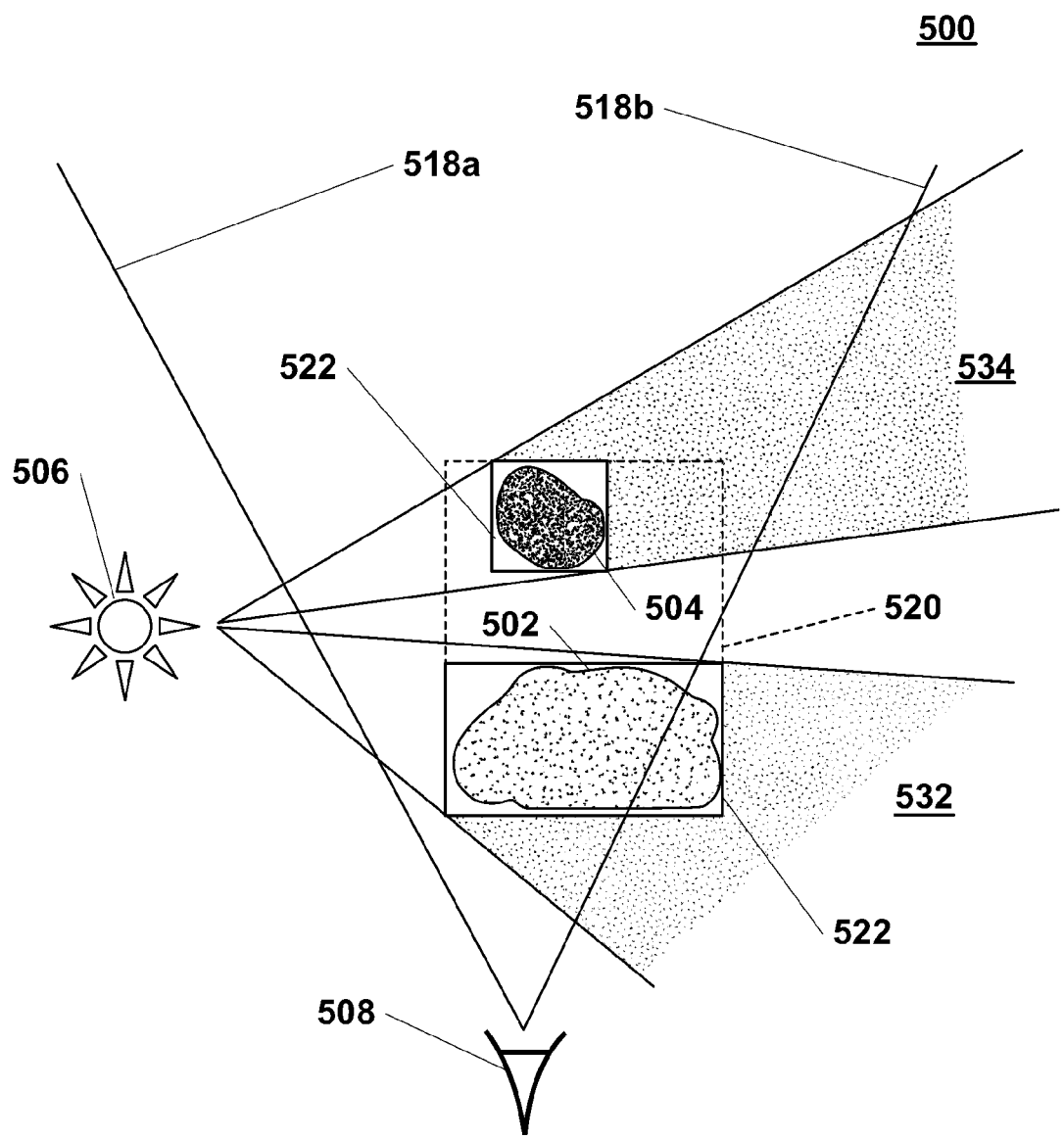

As shown in FIG. 9E, shadow volumes are generated by extruding the AABBs. It will be apparent from FIG. 9E that, within the viewing frustum, the shadow volume extruded from the AABB of the second occluder 504 is entirely hidden from the camera by the first occluder 502. Therefore, based upon the described occlusion query, the system can safely skip generating and rendering a shadow volume for the second occluder.

This conclusion is, of course, also true if the occluded node holds an entire subtree of the scene instead of just one object. When the tree traversal reaches a visible leaf node, its shadow volume is rendered using the methods described earlier in this chapter. It should be noted that is necessary to give special attention to cases of the light source being inside the currently processed AABB or of the camera being inside the extruded AABB. It is, however, quite simple to detect these cases, and we can then just traverse the node without performing an occlusion query.

Obviously, the same optimizations as used for conventional hierarchical occlusion culling can also be used for the extended method. Asynchronous occlusion queries and temporal coherence work as expected. The only difference is that, in order to take into account temporal coherence, we must include the coherency information per light source in each BVH node. That is, for each light and node, we store a visibility flag (whether or not a node's shadow volume was visible the last time it was checked), along with a frame ID (describing when the visibility information was last updated).

The hierarchical culling method described here does not increase performance in all cases. In fact, in some situations, rendering may even be slightly slower compared to simply drawing all the objects in the scene. However, for the majority of our scenes, hierarchical culling, both the original and the shadow volume variant, improves performance considerably. In cases such as a city walkthrough, this speedup is often dramatic.

It should be noted that the use of an AABB to generate a trial shadow volume as described herein will, on occasion, result in "false positive," where the system determines that the AABB shadow volume is visible even though the shadow volume of the actual occluder is not visible. In that case, the system will render the shadow volume of the second occluder even though it is not be necessary. However, because the use of an AABB to extrude a trial shadow volume results in a significant decrease in the amount of computing resources required to conduct an occlusion inquiry, an overall increase in efficiency will typically be achieved, even where there are a number of false positives.

2.4 RealityServer Implementation: Conclusion

Robust rendering of shadows can be achieved, even for difficult meshes, by employing a nonstandard method for generating shadow volume geometry. By using this method in combination with hierarchical hardware occlusion queries and geometry shaders, it is also possible to achieve high performance for situations that previously did not work well with stencil shadows. All the presented techniques are relatively straightforward to implement.

Figure 10A:
FIG. 10A shows a close up view of a city scene containing a complex tree mesh, in which the shadows were rendered according to described aspects of the present invention.
Figure 10B:
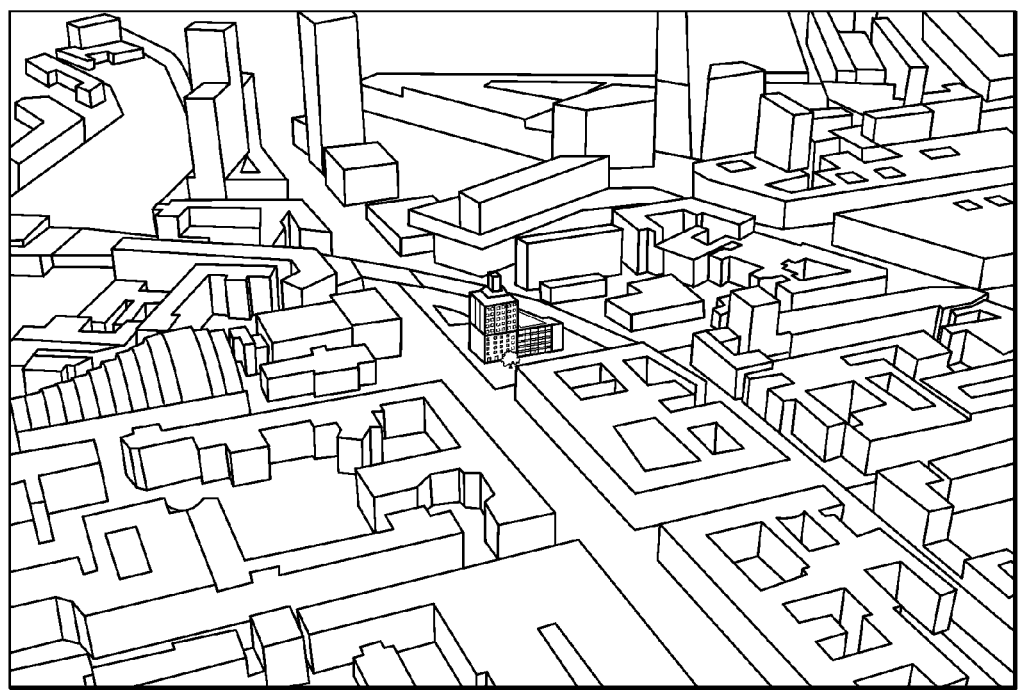
FIG. 10B shows a zoomed-out view of the scene shown in FIG. 10A.

Examples can be seen in FIGS. 10A and 10B. FIG. 10A shows a city scene close-up 600a containing a complex tree mesh with roughly 500,000 polygons. The robust technique correctly handles shadowing between the tree leaves. None of the meshes in the scene is a two-manifold. FIG. 10B shows the same model 600b as FIG. 10A, zoomed out. Both views render at interactive rates with dynamic shadow volume generation turned on.

It will be appreciated that the presently described techniques may be modified or enhanced. For example, additional performance optimizations may be implemented, especially for handling scenes with extremely high geometric complexity.

3. Digital Processing Environment in which Invention can be Implemented

Figure 11:
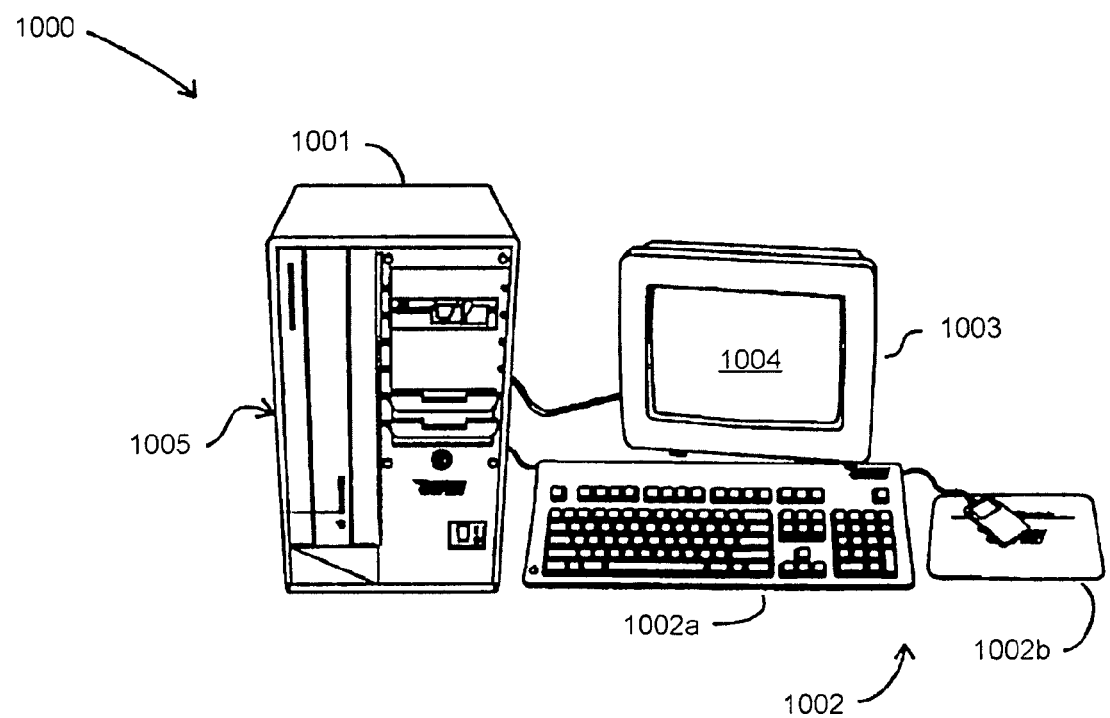
FIGS. 11 and 12A-12B are diagrams illustrating exemplary digital processing environments in which the described aspects of the invention may be suitably practiced.
Figure 12A:
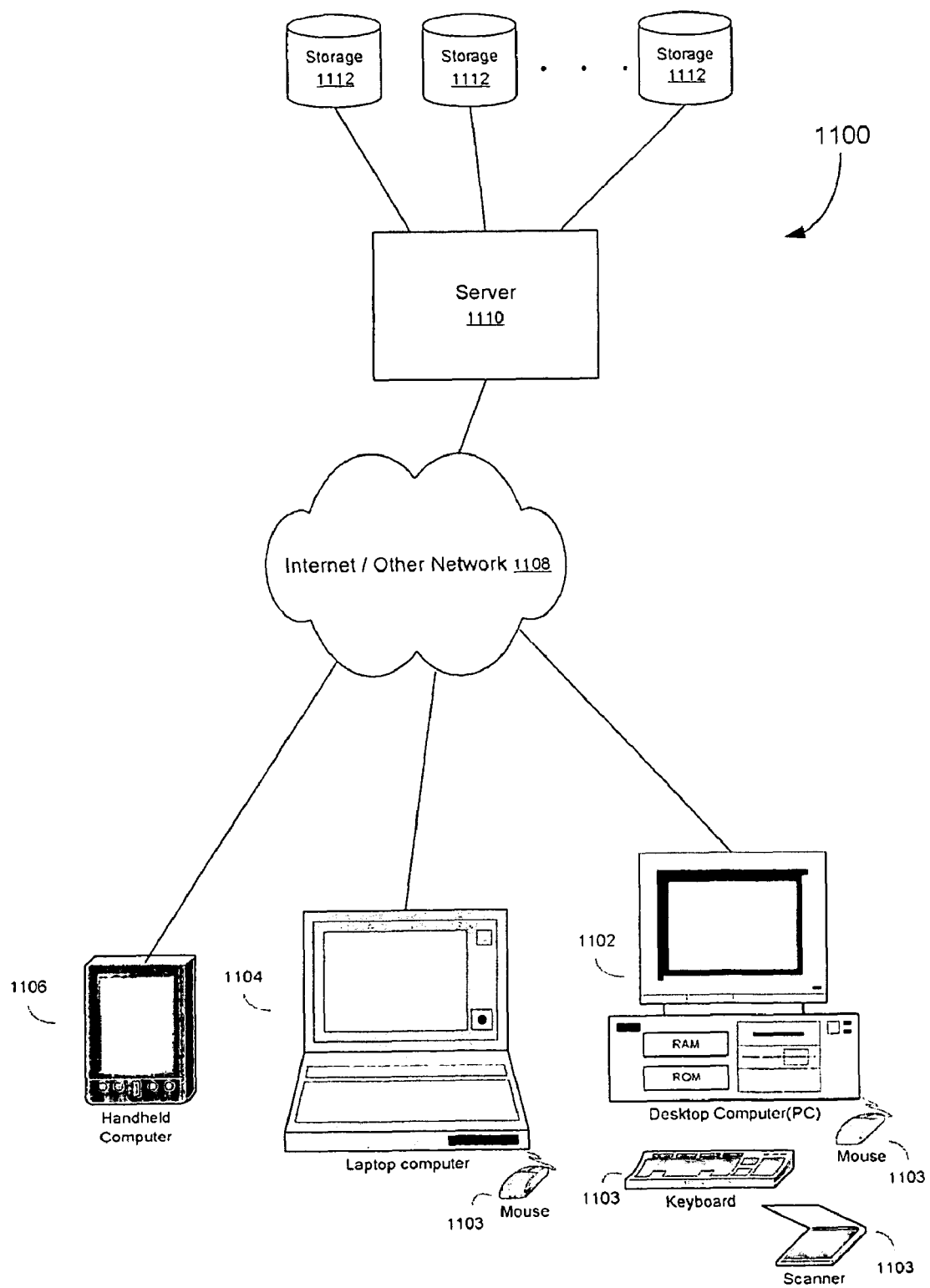
Figure 12B:
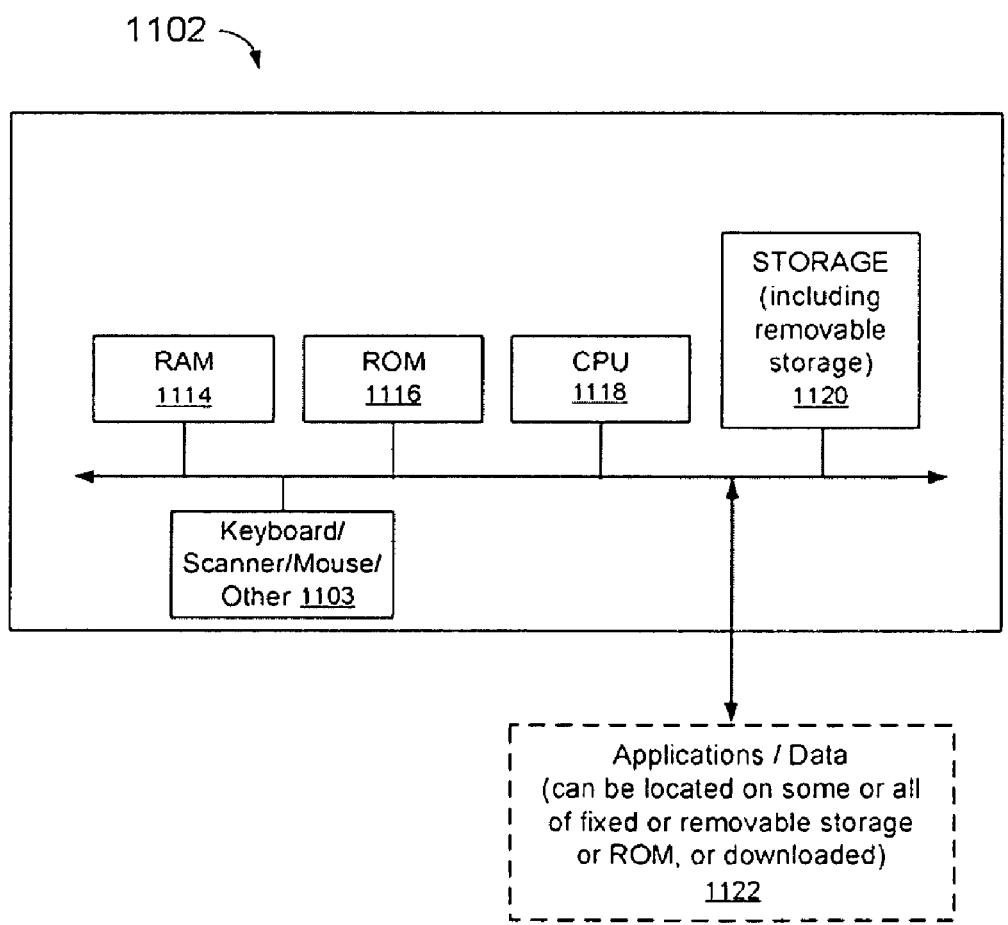

The following is a discussion, to be read in connection with FIGS. 11 and 12A-12B, of typical, relatively conventional digital processing structures and environments in which the above-described invention may be implemented and practiced.

It will be understood by those skilled in the art that the present invention, as described above, provides methods, systems, devices and computer program products that enable the creation of the appearance of rounded corners and edges and other activities in computer graphics systems, whose output is typically a human-perceptible (or digitally stored and/or transmitted) image or series of images that can comprise, for example, an animated motion picture, computer aided design representation, or other typical computer graphics output. The present invention can thus be implemented as part of the computer software or computer hardware of a computer that forms part of a computer graphics system, along with a display, user interface elements such as a keyboard, tablet and/or mouse, memory, storage, and other conventional computer graphics system components. While conventional components of such kind are well known to those skilled in the art, and thus need not be described in great detail herein, the following overview indicates how the present invention can be implemented in conjunction with such components in a computer graphics system.

More particularly, those skilled in the art will understand that the present invention can be utilized in the generation and synthesis of images, such as for display in a motion picture or other dynamic display. The techniques described herein can be practiced as part of a computer graphics system, in which a pixel value is generated for pixels in an image. The pixel value is representative of a point in a scene as recorded on an image plane of a simulated camera. The underlying computer graphics system can be configured to generate the pixel value for an image using a selected methodology, such as that of the present invention.

The previous detailed description illustrates examples of methods, structures, systems, and computer software products in accordance with these techniques. It will be understood by those skilled in the art that the described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. The various processing aspects and means described herein may therefore be implemented in the software and/or hardware elements of a properly configured digital processing device or network of devices. Processing may be performed sequentially or in parallel, and may be implemented using special purpose or re-configurable hardware.

As an example, FIG. 11 attached hereto depicts an illustrative computer system 1000 that can carry out such computer graphics processes. With reference to FIG. 11, the computer system 1000 in one embodiment includes a processor module 1001 and operator interface elements comprising operator input components such as a keyboard 1002A and/or a mouse 1002B (or digitizing tablet or other analogous element(s), generally identified as operator input element(s) 1002) and an operator output element such as a video display device 1003. The illustrative computer system 1000 can be of a conventional stored-program computer architecture. The processor module 1001 can include, for example, one or more processor, memory and mass storage devices, such as disk and/or tape storage elements (not separately shown), which perform processing and storage operations in connection with digital data provided thereto. The operator input element(s) 1002 can be provided to permit an operator to input information for processing. The video display device 1003 can be provided to display output information generated by the processor module 1001 on a screen 1004 to the operator, including data that the operator may input for processing, information that the operator may input to control processing, as well as information generated during processing. The processor module 1001 can generate information for display by the video display device 1003 using a so-called "graphical user interface" ("GUI"), in which information for various applications programs is displayed using various "windows."

The terms "memory", "storage" and "disk storage devices" can encompass any computer readable medium, such as a computer hard disk, computer floppy disk, computer-readable flash drive, computer-readable RAM or ROM element or any other known means of encoding digital information. The term "applications programs", "applications", "programs", "computer program product" or "computer software product" can encompass any computer program product consisting of computer-readable programs instruction encoded and/or stored on a computer readable medium, whether that medium is fixed or removable, permanent or erasable, or otherwise. As noted, for example, in block 1122 of the schematic block diagram of FIG. 12B, applications and data can be stored on a disk, in RAM, ROM, on other removable or fixed storage, whether internal or external, and can be downloaded or uploaded, in accordance with practices and techniques well known in the art. As will also be noted in this document, the present invention can take the form of software or a computer program product stored on a computer-readable medium, or it can be in the form of computer program code that can be uploaded or downloaded, or fixed in an FPGA, ROM or other electronic structure, or it can take the form of a method or a system for carrying out such a method. In each case, the invention is operable to enable a computer or computer system to calculate a pixel value for pixels in an image or scene, and the pixel value can be used by other elements of a computer graphics system, which can be conventional elements such as graphics cards, display controllers, or display elements such as LCDs and/or CRTs, to generate a display-controlling electrical or electronic output, and ultimately to enable the display of an image in a human-perceptible form, and/or the storage of such an image (or data specifying such an image) for later display and/or processing.

Although the computer system 1000 is shown as comprising particular components, such as the keyboard 1002a and mouse 1002b for receiving input information from an operator, and a video display device 1003 for displaying output information to the operator, it will be appreciated that the computer system 1000 may include a variety of components in addition to or instead of those depicted in FIG. 11.

In addition, the processor module 1001 can include one or more network ports, generally identified by reference numeral 1005, which are connected to communication links which connect the computer system 1000 in a computer network. The network ports enable the computer system 1000 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

In addition to the computer system 1000 shown in the drawings, methods, devices or software products in accordance with the present invention can operate on any of a wide range of conventional computing devices and systems, such as those depicted by way of example in FIGS. 12A and 12B (e.g., network system 1100), whether standalone, networked, portable or fixed, including conventional PCs 1102, laptops 1104, handheld or mobile computers 1106, or across the Internet or other networks 1108, which may in turn include servers 1110 and storage 1112.

In line with conventional computer software and hardware practice, a software application configured in accordance with the invention can operate within, e.g., a PC 1102 like that shown in FIGS. 12A-12B, in which program instructions can be read from ROM or CD-ROM 1116 (FIG. 12B), magnetic disk or other storage 1120 and loaded into RAM 1114 for execution by CPU 1118. Data can be input into the system via any known device or means, including a conventional keyboard, scanner, mouse, digitizing tablet, or other elements 1103. As shown in FIG. 12B, the depicted storage 1120 includes removable storage. As further shown in FIG. 12B, applications and data 1122 can be located on some or all of fixed or removable storage or ROM, or downloaded.

Those skilled in the art will understand that the method aspects of the invention described herein can be executed in hardware elements, such as a Field-Programmable Gate Array (FPGA) or an Application-Specific Integrated Circuit (ASIC) constructed specifically to carry out the processes described herein, using ASIC construction techniques known to ASIC manufacturers. Various forms of ASICs are available from many manufacturers, although currently available ASICs do not provide the functions described in this patent application. Such manufacturers include Intel Corporation and NVIDIA Corporation, both of Santa Clara, Calif. The actual semiconductor elements of a conventional ASIC or equivalent integrated circuit are not part of the present invention, and will not be discussed in detail herein.

Those skilled in the art will also understand that ASICs or other conventional integrated circuit or semiconductor elements can be implemented in such a manner, using the teachings of the present invention as described in greater detail herein, to carry out the methods of the present invention as shown in FIGS. 1-10, discussed above.

Those skilled in the art will also understand that method aspects of the present invention can be carried out within commercially available digital processing systems, such as workstations and personal computers (PCs), operating under the collective command of the workstation or PC's operating system and a computer program product configured in accordance with the present invention. The term "computer program product" can encompass any set of computer-readable programs instructions encoded on a computer readable medium. A computer readable medium can encompass any form of computer readable element, including, but not limited to, a computer hard disk, computer floppy disk, computer-readable flash drive, computer-readable RAM or ROM element, or any other known means of encoding, storing or providing digital information, whether local to or remote from the workstation, PC or other digital processing device or system. Various forms of computer readable elements and media are well known in the computing arts, and their selection is left to the implementer. In each case, the invention is operable to enable a computer system to calculate a pixel value, and the pixel value can be used by hardware elements in the computer system, which can be conventional elements such as graphics cards or display controllers, to generate a display-controlling electronic output. Conventional graphics cards and display controllers are well known in the computing arts are not necessarily part of the present invention, and their selection can be left to the implementer.

While the foregoing description includes details which will enable those skilled in the ail to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A method, executable in a computer processor operable to render images for display on a human-perceptible display element, the rendering comprising processing of data corresponding to triangles, each triangle having edges, vertices and an associated triangle plane, and the displaying comprising the display of shadows in three-dimensional (3D) scenes, the shadows being displayed in relation to a simulated light source, the method comprising:
   executing, in the computer processor, a shadow volume creation method, the shadow volume creation method comprising:
   for each non-degenerated triangle used in image rendering:
   (1) computing, in the computer processor, a parameter d of a triangle as the dot product between the surface normal and the direction from an arbitrary point on the triangle plane to the light source;
   (2) creating, in the computer processor, shadow caps, the creating of shadow caps comprising:
      (a) if necessary, rendering, in the computer processor, the triangle to create a near cap of the shadow volume:
      (b) extending, in the computer processor, triangle vertices to infinity and inverting their orientation to render a far cap of the shadow volume, if necessary;
      (c) If d is negative, performing (a) and (b) in the computer processor with inverted vertex orientation to ensure correct ordering of shadow volume faces; and
   (3) in the computer processor, extruding to infinity each edge of the triangle for which the d parameter of a triangle being processed has a different sign than the d parameter for an adjacent triangle, and rendering the resulting quadrilateral, extruding also to infinity edges that do not have an adjacent triangle associated therewith, and again utilizing the positive or negative sign of parameter d to adjust vertex ordering, and further comprising:
   executing, in the computer processor, a bounding volume hierarchy (BVH) traversal method, the BVH method comprising:
      (a) starting with the root node holding the entire scene, and recursively traversing:
      (b) generating the shadow volume of the current node, the generating comprising generating the shadow volume of the bounding volume of the current node, instead of the actual volumes of the enclosed geometry:
      (c) testing the generated shadow volume for intersection with the viewing frustum; and if it does not intersect, skipping the children of this node; otherwise, performing, asynchronously, an occlusion query on the volume geometry, without writing to the stencil buffer; and depending on the query result, disregarding the children or recursively traverse; and
      (d) when a leaf node is reached and its node shadow volume is found to be visible, rendering the actual geometry shadow volume into the stencil buffer.

2. A computer processing module operable within a computer graphics processor, the computer graphics processor operable to render images for display on a human perceptible display element the rendering comprising processing of data corresponding to triangles, each triangle having edges, vertices and an associated triangle plane, and the displaying comprising the display of shadows in three-dimensional (3D) scenes, the shadows being displayed in relation to a simulated light source, the computer processing module comprising:
   computer processor means in the computer processing module for executing a shadow volume creation method, the computer processor means for executing the shadow volume creation method comprising means in the computer processing module for executing shadow volume computations, for each non-degenerated triangle used in image rendering, the means for executing shadow volume computations comprising:
   (1) computer processor means in the computer processing module for computing a parameter d of a triangle as the dot product between the surface normal and the direction from an arbitrary point on the triangle plane to the light source;
   (2) computer processor means in the computer processing module for creating shadow caps, the creating of the shadow caps comprising:
      (a) if necessary, rendering the triangle to create a near cap of the shadow volume;
      (b) extending triangle vertices to infinity and inverting their orientation to render a far cap of the shadow volume, if necessary;
      (c) if d is negative, performing (a) and (b) with inverted vertex orientation to ensure correct ordering of shadow volume faces; and
   (3) computer processor means in the computer processing module for extruding to infinity each edge of the triangle for which the d parameter of a triangle being processed has a different sign than the d parameter for the adjacent triangle, and rendering the resulting quadrilateral, extruding also to infinity edges that do not have an adjacent triangle associated therewith, and again utilizing the positive or negative sign of parameter d to adjust vertex ordering, and further comprising:
   computer processor means in the computer processing module for executing a bounding volume hierarchy (BVH) traversal method, the BVH method comprising:
      (a) starting with the root node holding the entire scene and recursively traversing;
      (b) generating the shadow volume of the current node, the generating comprising generating the shadow volume of the bounding volume of the current node, instead of the actual volumes of the enclosed geometry;
      (c) testing the generated volume for intersection with the viewing frustum; and if it does not intersect, skipping the children of this node; otherwise, performing, asynchronously, an occlusion query on the volume geometry, without writing to the stencil buffer; and depending on the query result, disregarding the children or recursively traverse; and (d) when a leaf node is reached and its node shadow volume is found to be visible, rendering the actual geometry shadow volume into the stencil buffer.

3. A computer program product comprising computer program instructions encoded onto a non-transitory computer-readable medium, the computer program instructions being operable within a computer graphics system for rendering images for display on a human perceptible display element, the rendering comprising processing of data corresponding to triangles, each triangle having edges, vertices and an associated triangle plane, and the displaying comprising the display of shadows in three-dimensional (3D) scenes, the shadows being displayed in relation to a simulated light source, the computer program product comprising:

computer program code means, comprising computer-readable instructions, operable the computer graphics system for executing a shadow volume creation method, the first code means for executing the shadow volume creation method comprising means for executing shadow volume computations, for each non-degenerated triangle used in image rendering, the means for executing shadow volume computations comprising:

(1) computer program code means, comprising computer-readable instructions operable within the computer graphics system for computing a parameter d of a triangle as the dot product between the surface normal and the direction from an arbitrary point on the triangle plane to the light source:

(2) computer program code means, comprising computer-readable instructions operable within the computer graphics system for creating shadow caps, the creating of the shadow caps comprising:

(a) if necessary, rendering the triangle to create a near cap of the shadow volume;

(b) extending triangle vertices to infinity and inverting their orientation to render a far cap of the shadow volume, if necessary;

(c) If d is negative, performing (a) and (b) with inverted vertex orientation to ensure correct ordering of shadow volume faces; and (3) computer program code means, comprising computer-readable instructions operable within the computer graphics system for extruding to infinity each edge of the triangle for which the d parameter of the current triangle has a different sign than the d parameter for the adjacent triangle, and rendering the resulting quadrilateral, extruding also to infinity edges that do not have an adjacent triangle associated therewith, and again utilizing the positive or negative sign of d to adjust vertex ordering; and further comprising:

computer program code means comprising computer-readable instructions operable within the computer graphics system for executing a bounding volume hierarchy (BVH) traversal method, the BVH traversal method comprising:

(a) starting with the root node holding the entire scene, and recursively traversing:

(b) generating the shadow volume of the current node, the generating comprising generating the shadow volume of the bounding volume of the current node, instead of the actual volumes of the enclosed geometry;

(c) testing the generated volume for intersection with the viewing frustum; and if it does not intersect, skipping the children of this node; otherwise, performing, asynchronously, an occlusion query on the volume geometry, without writing to the stencil buffer; and depending on the query result, disregarding the children or recursively traverse; and (d) when a leaf node is reached and its node shadow volume is found to be visible, rendering the actual geometry shadow volume into the stencil buffer.

4. The method of claim 1, further comprising:

in the computer processor, executing a selected processing of a polygon mesh representation in conjunction with a simulated light source, wherein some surfaces represented by the polygon mesh representation face towards the simulated light source ("towards surfaces"), some surfaces represented by the polygon mesh representation face away from the simulated light source ("away surfaces"), and a number of edges are shared by or common to the towards surfaces and the away surfaces, the selected processing comprising:

(1) first, in the computer processor, extruding edges that do not have neighbor polygons;

(2) second, in the computer processor, taking into account all polygons in the mesh, including polygon surfaces facing the simulated light source ("towards surfaces") and polygon surfaces facing away from the simulated light source ("away surfaces"), so as to extrude possible silhouette edges and enable creation of the shadow caps, the taking into account all polygons in the mesh comprising:

(a) in the computer processor, extruding the "towards" surfaces to generate a first set of shadow volumes;

(b) in the computer processor, extruding the "away" surfaces to generate a second set of shadow volumes; and (c) in the computer processor, combining the first and second set of shadow volumes to form a correct resultant shadow volume for the entire mesh representation, wherein edges common to the towards and away surfaces are extruded twice, and the resulting sides close the shadow volumes of both the light-facing and the non-light-facing polygons.

5. The method of claim 4, further comprising handling degenerated triangles by applying, in the computer processor, the selected processing of claim 4.

6. The computer processing module of claim 2, wherein the computer processor means for executing a shadow volume creation method further comprises:

computer processor means in the computer processing module for executing a selected processing of a polygon mesh representation in conjunction with a simulated light source, wherein some surfaces represented by the polygon mesh representation face towards the simulated light source ("towards surfaces"), some surfaces represented by the polygon mesh representation face away from the simulated light source ("away surfaces"), and a number of edges are shared by or common to the towards surfaces and the away surfaces, the selected processing comprising:

(1) first, extruding edges that do not have neighbor polygons;

(2) second, taking into account all polygons in the mesh, including polygon surfaces facing the simulated light source ("towards surfaces") and polygon surfaces facing away from the simulated light source ("away surfaces"), so as to extrude possible silhouette edges and enable creation of the shadow caps, the taking into account all polygons in the mesh comprising:

(a) extruding the "towards" surfaces to generate a first set of shadow volumes;
(b) extruding the "away" surfaces to generate a second set of shadow volumes; and
(c) combining the first and second set of shadow volumes to form a correct resultant shadow volume for the entire mesh representation, wherein edges common to the towards and away surfaces are extruded twice, and the resulting sides close the shadow volumes of both the light-facing and the non-light-facing polygons.

7. The computer processing module claim 6, further comprising computer processing means in the computer processing module for handling degenerated triangles by applying the selected processing of claim 6.

8. The computer program product of claim 3, further comprising, on the non-transitory computer-readable medium:
   computer program code means, comprising computer-readable instructions operable within the computer graphics system for executing a selected processing of a polygon mesh representation in conjunction with a simulated light source, wherein some surfaces represented by the polygon mesh representation face towards the simulated light source ("towards surfaces"), some surfaces represented by the polygon mesh representation face away from the simulated light source ("away surfaces"), and a number of edges are shared by or common to the towards surfaces and the away surfaces, the selected processing comprising:
   (1) first, extruding edges that do not have neighbor polygons:
   (2) second, taking into account all polygons in the mesh, including polygon surfaces facing the simulated light source ("towards surfaces") and polygon surfaces facing away from the simulated light source ("away surfaces"), so as to extrude possible silhouette edges and enable creation of the shadow caps, the taking into account all polygons in the mesh comprising:
      (a) extruding the "towards" surfaces to generate a first set of shadow volumes;
      (b) extruding the "away" surfaces to generate a second set of shadow volumes; and
      (c) combining the first and second set of shadow volumes to form a correct resultant shadow volume for the entire mesh representation, wherein edges common to the towards and away surfaces are extruded twice, and the resulting sides close the shadow volumes of both the light-facing and the non-light-facing polygons.

9. The computer program product of claim 8, further comprising, on the non-transitory computer-readable medium:
   computer-readable instructions operable within the computer graphics system for handling degenerated triangles by applying the selected processing of claim 8.

* * * * *